(12) United States Patent
Anseth et al.

(10) Patent No.: US 8,343,710 B1
(45) Date of Patent: Jan. 1, 2013

(54) PHOTODEGRADABLE GROUPS FOR TUNABLE POLYMERIC MATERIALS

(75) Inventors: Kristi S. Anseth, Boulder, CO (US); Andrea M. Kasko, Boulder, CO (US)

(73) Assignee: The Regents of the University of Colorado, A Body Corporate, Boulder, CO (US)

(*) Notice: Subject to any disclaimer, the term of this patent is extended or adjusted under 35 U.S.C. 154(b) by 1075 days.

(21) Appl. No.: 11/374,471

(22) Filed: Mar. 13, 2006

Related U.S. Application Data

(60) Provisional application No. 60/660,945, filed on Mar. 11, 2005.

(51) Int. Cl.
*C07C 205/00* (2006.01)
*C07C 205/04* (2006.01)
*C08F 20/34* (2006.01)
*G03C 1/00* (2006.01)
*G03F 7/00* (2006.01)

(52) U.S. Cl. ............. 430/281.1; 522/173; 522/182; 568/584; 568/939

(58) Field of Classification Search ............ 522/173, 522/182, 183; 430/281.2, 282.1, 283.1, 284.1, 430/285.1, 286.1, 287.1, 288.1; 568/584, 568/939
See application file for complete search history.

(56) References Cited

U.S. PATENT DOCUMENTS

| | | | |
|---|---|---|---|
| 3,853,814 A | 12/1974 | Guillet | |
| 3,860,538 A | 1/1975 | Guillet et al. | |
| 3,903,064 A | 9/1975 | Isigami et al. | |
| 3,963,491 A | 6/1976 | Marsh | |
| 3,963,791 A | 6/1976 | Giuffre et al. | |
| 4,013,572 A | 3/1977 | Marsh et al. | |

(Continued)

FOREIGN PATENT DOCUMENTS

EP 0 392 759 10/1990
(Continued)

OTHER PUBLICATIONS

Baldursodottir et al. (2003) "Riboflavion-Photosentitized Changes in Aqueous Solutions of Alginate. Rheological Studies," *Biomacromolecules* 4:429-436.

(Continued)

*Primary Examiner* — Susan W Berman
(74) *Attorney, Agent, or Firm* — Greenlee Sullivan P.C.

(57) ABSTRACT

Provided is a method that provides both spatial and temporal control of a polymer degradation process using mono- and multifunctional macromolecular monomers ("macromers") that degrade via single- and multi-photon photolysis mechanisms over a broad range of wavelengths. The macromers can form or be incorporated into networks via covalent, non-covalent and/or ionic interactions. The spatial and temporal degradation of these networks can be controlled. More specifically, provided is a photodegradable macromer, comprising: (a) a photodegradable group; (b) a backbone structure comprising one or more repeating units that may be the same or different, which backbone structure is attached to the photodegradable group directly or through a linker; (c) one or more reactive end groups at one or more ends of the macromer; and optionally, (d) one or more therapeutic agents; and optionally (e) one or more caged groups. Also provided are polymers and networks incorporating macromers of the invention and optionally other substituents such as other polymeric structures. Also provided is a method of controlled degradation of a polymer comprising: providing a photodegradable polymer as described herein and exposing the photodegradable polymer to photoradiation of the appropriate wavelength and energy to cause one or more of the photodegradable groups to photodegrade.

7 Claims, 6 Drawing Sheets

U.S. PATENT DOCUMENTS

| | | | |
|---|---|---|---|
| 4,028,480 | A | 6/1977 | Le Brasseur |
| 4,176,145 | A | 11/1979 | Guillet |
| 4,186,003 | A | 1/1980 | Marsh et al. |
| 4,978,498 | A | 12/1990 | Yoshihiro et al. |
| 5,164,420 | A | 11/1992 | Dais |
| 5,194,527 | A | 3/1993 | O'Brien et al. |
| 5,204,412 | A | 4/1993 | Davidson et al. |
| 5,306,505 | A | 4/1994 | Kuzuya et al. |
| 5,360,892 | A | 11/1994 | Bonsignore et al. |
| 5,434,272 | A * | 7/1995 | Corrie et al. ............... 548/525 |
| 5,434,277 | A | 7/1995 | Hwu et al. |
| 5,489,678 | A | 2/1996 | Fodor et al. |
| 5,626,863 | A | 5/1997 | Hubbell et al. |
| 5,635,608 | A * | 6/1997 | Haugland et al. ............ 536/1.11 |
| 5,739,386 | A * | 4/1998 | Holmes ........................ 562/437 |
| 5,763,599 | A | 6/1998 | Pfleiderer et al. |
| 5,773,308 | A * | 6/1998 | Conrad et al. ................ 436/527 |
| 5,981,207 | A * | 11/1999 | Burbaum et al. .............. 435/21 |
| 5,986,043 | A | 11/1999 | Hubbell et al. |
| 6,022,963 | A | 2/2000 | McGall et al. |
| 6,147,205 | A | 11/2000 | McGall et al. |
| 6,306,922 | B1 | 10/2001 | Hubbell et al. |
| 6,322,970 | B1 * | 11/2001 | Little et al. .................... 506/6 |
| 6,342,349 | B1 * | 1/2002 | Virtanen ........................ 506/39 |
| 6,566,515 | B1 | 5/2003 | McGall et al. |
| 6,602,975 | B2 | 8/2003 | Hubbell et al. |
| 6,703,037 | B1 | 3/2004 | Hubbell et al. |
| 6,738,661 | B1 | 5/2004 | Nyhart, Jr. |
| 6,750,335 | B2 | 6/2004 | Pfleiderer et al. |
| 6,756,492 | B1 | 6/2004 | Beier et al. |
| 7,541,193 | B2 * | 6/2009 | Nguyen et al. ................. 436/172 |
| 7,544,721 | B2 * | 6/2009 | Gaud et al. .................... 522/151 |
| 2003/0215395 | A1 | 11/2003 | Yu et al. |
| 2006/0194145 | A1 * | 8/2006 | Irvine et al. ................. 430/270.1 |

FOREIGN PATENT DOCUMENTS

| | | |
|---|---|---|
| EP | 0 426 436 A2 | 5/1991 |
| EP | 0 426 436 A3 | 1/1992 |
| WO | WO 90/12049 | 10/1990 |
| WO | WO 94/10128 | 5/1994 |
| WO | WO 03/097107 | 11/2003 |
| WO | WO 2004/087777 | 10/2004 |

OTHER PUBLICATIONS

Furuta et al. (Feb. 1999) "Brominated 7-Hydroxycoumarin-4-ylmethyls: Photolabile Protecting Groups with Biologically Useful Cross-Sections for Two Photon Photolysis," *Proc. Nat. Acad. Sci. USA* 96:1193-1200.

Holmes et al. (1995) "Reagents for Combinatorial Organic Synthesis: Development of a New O-Nitrobenzyl Photolabile Linker for Solid Phase Synthesis," *J. Org. Chem.* 60:2318-2319.

Johnson et al. (2007) "Synthesis of Photocleavable Linear Macromonomers by ATRP and Star Macromonomers by a Tandem ATRP—Click Reaction: Precursors to Photodegradable Model Networks," *Macromolecules* 40:3589-3598.

Kjoniksen et al. (2004) "Characterization of Riboflavin-Photoseneitized Changes in Acqueous Solutions of Alginate. Rheological Studies," *Marcomol. Biosci.* 4(2):76-83.

Kolb et al. (2003) "The Growing Impact of Click Chemistry in Drug Discovery," *Drug Discov. Today* 8(24):1128-1137.

Lei et al. (Oct. 12, 2004) "High-Resolution Technique for Fabricating Environmentally Sensitive Hydrogel Microstructures," *Langmuir* 20(21):8947-8951.

Luo et al. (Apr. 2004) "A Photolabile Hydrogel for Guided Three-Dimensional Cell Growth and Migration," *Nat. Mater.* 3:249-253.

Nuttleman et al. (2005) "Dexamethasone-Functionalized Gels Induce Osteogenic Differentiation of Encapsulated hMSCs," *J. Biomed. Mater. Res. A* 76A:183-195.

Ruhland et al. (1996) "Solid-Supported Combinatorial Synthesis of Structurally Diverse Beta-Lactams," *J. Am. Chem. Soc.* 118:253-254.

Wang et al. (2003) "Bioconjugation by Copper(I)-Catalyzed Azide-Alkyne [3+2] Cycloaddition," *J. Am. Chem. Soc.* 125:3192-3193.

Wilcox et al. (1990) "Synthesis of Photolabile "Precursors" of Amino Acid Neurotransmitters," *J. Org. Chem.* 55:1585-1589.

Yui et al. (1993) "Photo-Responsive Degradation of Heterogeneous Hydrogels Comprising Cross-Linked Hyaluronic-Acid and Lipid Microspheres for Temporal Drug-Delivery," *J. Controlled Release* 26(2):141-145.

Zhao et al. (2004) "New Caged Coumarin Fluorophores with Extraordinary Uncaging Cross Sections Suitable for Biological Imaging Applications," *J. Am. Chem. Soc.* 126:4653-4663.

* cited by examiner

PHOTODEGRADABLE GROUPS FOR TUNABLE POLYMERIC MATERIALS

CROSS-REFERENCE TO RELATED APPLICATIONS

This application claims priority from U.S. provisional application 60/660,945 filed Mar. 11, 2005, which is incorporated by reference to the extent not inconsistent with the disclosure herein.

BACKGROUND OF THE INVENTION

Materials and biomaterials with tunable properties are useful in numerous applications ranging from tissue engineering and drug delivery to materials processing and recycling. A critical aspect of designing biomaterial carriers for cell and/or drug delivery is tuning and controlling the material's degradation behavior.

Current degradation technology uses hydrolysis and/or enzymatic degradation, which are sustained processes that offer minimal spatial or temporal control. Most synthetic biomaterials degrade via hydrolysis, which can occur throughout the bulk or only at the surface of a biomaterial and leads to a sustained and non-instantaneous mass loss, which may be undesirable. Current photopolymerization and photodegradation techniques require the use of a photosensitizer, and often have no spatial control.

There is a need for an improved degradation process that allows for spatial and temporal control of degradation.

SUMMARY OF THE INVENTION

Provided is a method that provides both spatial and temporal control of the degradation process using mono- and multifunctional macromolecular monomers ("macromers") that degrade via single- and multi-photon photolysis mechanisms over a broad range of wavelengths. The macromers can form or be incorporated into networks via covalent, non-covalent and/or ionic interactions. These networks can controllably degrade both spatially and temporally.

More specifically, provided is a photodegradable macromer, comprising: (a) a photodegradable group; (b) a backbone structure comprising one or more repeating units that may be the same or different, which backbone structure is attached to the photodegradable group directly or through a linker; (c) one or more reactive end groups at one or more ends of the macromer; and optionally, (d) one or more therapeutic agents; and optionally (e) one or more caged groups.

Also provided are polymers and networks incorporating macromers of the invention and optionally other substituents such as other polymeric structures.

Also provided is a method of controlled degradation of a polymer comprising: providing a photodegradable polymer as described herein and exposing the photodegradable polymer to photoradiation of the appropriate wavelength and energy to cause one or more of the photodegradable groups to photodegrade.

As used herein, "photodegradable group" is a group that breaks one or more bonds in response to exposure to radiation of the appropriate wavelength and energy. The appropriate wavelength and energy is easily determinable by one of ordinary skill in the art without undue experimentation such as by the use of an absorbance spectrum to determine what wavelength(s) will cause photodegradation. The degradation of the photodegradable group does not need a photosensitizer, although a photosensitizer may be used if desired. The use of the invention with a photosensitizer is easily performed by one of ordinary skill in the art without undue experimentation. Single- or multi-photon photolysis can be used to photodegrade the photodegradable group. A broad range of wavelengths may be used for photodegradation, for example, those wavelengths in the ultraviolet spectrum, visible and infrared spectrum (between about 180 nm and 1.5 µm, for example) and all individual values and ranges therein, including UV-A (between about 320 and about 400 nm); UV-B (between about 280 and about 320 nm); and UV-C (between about 200 and about 280 nm). Other useful ranges include the radiation from visible, near-IR and IR lasers (about 500 nm to about 1.5 µm). All individual wavelengths and all intermediate ranges therein are intended to be included in this disclosure as if they were each listed separately.

Examples of photodegradable groups include those groups having the structure:

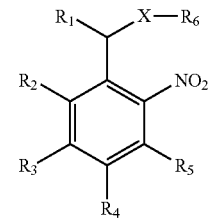

where X is O, N or S;

$R_1$ is selected from the group consisting of: hydrogen, straight-chain or branched C1-C10 alkyl, aryl, alkoxy, aryloxy or carboxy groups in which one or more carbon atoms can be independently optionally substituted with one or more heteroatoms, and one or more hydrogen atoms can be independently optionally substituted with hydroxyl, halogen or oxygen atoms;

$R_2$-$R_6$ are independently selected from the group consisting of: hydrogen; one or more polymerizable groups, one or more reactive end groups; straight chain, branched or cyclic C1-C20 alkyl, alkenyl, alkynyl groups in which one or more of the carbon atoms are optionally substituted with non-hydrogen substituents and wherein one or more C, CH or CH2 moiety can be replaced with an oxygen atom, a nitrogen atom, an NR' group, or a S atom; and an optionally substituted aromatic or non-aromatic ring structure, wherein two or more R groups can be linked to form one or more rings which can contain one or more of the same or different heteroatoms; one or more R groups can be optionally substituted with one or more substituent groups selected from halogens; nitro groups; cyano groups; isocyano groups; thiocyano groups; isothiocyano groups; azide groups; —$SO_2$ groups; —$OSO_3H$ groups; one or more optionally substituted straight-chain, branched or cyclic alkyl, alkenyl or alkynyl groups; OR'; —CO—OR'; —O—CO—R'; —N(R')$_2$; —CO—N(R')$_2$; —NR'—CO—OR'; —SR'; —SOR'; —$SO_2$—R'; —$SO_3$R'; —$SO_2$N(R')$_2$; —P(R')$_2$; —$OPO_3$(R')$_2$; and —Si(R')$_3$ wherein each R', independent of other R' in the substituent group can be a hydrogen, an optionally substituted straight-chain, branched or cyclic alkyl, alkenyl or alkynyl group wherein one or more C, CH or $CH_2$ groups therein can be replaced with an O atom, N atom, S atom or —NH group; an optionally substituted aromatic group, two or more R' groups can be linked together to form a ring which may contain one or more of the same or different heteroatoms; and R' can in turn be optionally substituted with one or more groups selected from the group consisting of halogens, nitro groups; cyano groups; isocyano groups; thiocyano groups; isothiocyano groups; azide groups; —SO$_2$ groups; —OSO$_3$H groups; straight-chain, branched or cyclic alkyl, alkenyl or alkynyl groups; halogenated alkyl groups; hydroxyl groups; alkoxy groups; carboxylic acid and carboxylic ester groups; amine groups; carbamate groups, thiol groups, thioether and thioester groups; sulfoxide groups, sulfone groups; sulfide groups; sulfate and sulfate ester groups; sulfonate and sulfonate ester groups; sulfonamide groups, sulfonate ester groups; phosphine groups; phosphate and phosphate ester groups; phosphonate and phosphonate ester groups; and alkyl-substituted silyl groups; and any of the R groups may be linked to the backbone structure, reactive end group or other groups directly or using a linker.

One class of photodegradable groups has the formula:

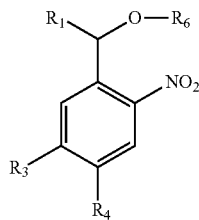

wherein R1 is hydrogen or a C1-C3 alkyl group; R3 and R4 are independently hydrogen or a C1-C10 straight chain or branched alkyl group wherein one or more carbon atoms in the chain may be replaced with oxygen and R6 comprises a backbone structure, a reactive end group, a therapeutic agent or a caged group. In one class of macromers of the invention, a reactive end group is an acrylate group, and the backbone comprises poly(ethylene glycol).

One class of photodegradable groups contains a nitro group ortho to an ester functionality on an aromatic ring structure. Other examples of photodegradable groups are known in the art, including those photodegradable groups described in WO 94/10128; U.S. Pat. No. 5,489,678; U.S. Pat. No. 5,763,599; U.S. Pat. No. 6,022,963; U.S. Pat. No. 6,147,205; U.S. Pat. No. 6,566,515; U.S. Pat. No. 6,756,492; U.S. Pat. No. 6,750,335; Furuta, et al. Proc. Natl. Acad. Sci. USA 96: 1193-1200 (February 1999); Holmes, et al. J. Org. Chem. 60: 2318-2319 (1995); Wilcox, et al. J. Org. Chem. 55: 1585-1589 (1990); Zhao, et al., J. Am. Chem. Soc. 126: 4653-4663 (2004), which references are incorporated by reference.

As used herein, a "macromer" is a group comprising one or more repeating units and one or more reactive end groups that allow reaction with another group.

The "backbone structure" comprises any repeating unit into which a photodegradable group can be attached. There are many repeating units known in the art. All repeating units that function in the macromers and polymers of the invention are intended to be included in this disclosure, even if not specifically mentioned. Some examples of useful repeating units include poly(ethylene glycol), poly(ethylene oxide), poly(vinyl alcohol), poly(vinylpyrrolidone), poly(ethyloxozoline), poly(ethylene oxide)/poly(propyleneoxide) block copolymers, polysaccharides, poly(hydroxylethylmethacrylates), poly(urethanes), poly(hydroxyethylacrylates), collagen, poly(ester)s, poly α-hydroxyesters, carbohydrates, proteins, poly(oxazoline), polyamino acids, poly(lactides), poly(styrenes), poly(acrylates), poly(methacrylates), poly(vinylethers), polyethylenes, poly(ethylene imine)s, polyesters, poly(urethane)s, and polypropylenes or any other polymer known in the art, and combinations thereof. Some backbones that are particularly useful for lithographic applications include poly(styrene), poly(acrylate), poly(methacrylate), poly(vinyl ether). The backbone can contain two or more different repeating units in any sequence, including random, gradient, alternating or block. The repeating units may be amphiphilic with respect to each other, the photodegradable group, the reactive end group and any other group in the macromer.

"Reactive end groups" include those groups that are polymerizable by cationic, anionic, coordination, free-radical, condensation and/or other reactions as known in the art such as a pseudo-Michael addition. The reactive end groups may also form polymers through ionic interactions, self-assembly or non-covalent interactions, as known in the art. There are many reactive end groups known in the art. All reactive end groups that function in the macromers and polymers of the invention are intended to be included in this disclosure, even if not specifically mentioned. Some examples of reactive end groups include: acrylate, methacrylate, styrene, allyl ether, vinyl ether, isocyanate, cyanoacrylate, triazide, phosphazine, imine, oxazoline, propylene sulfide, groups polymerizable using condensation reactions as known in the art, alkene, alkyne, "click" chemistry, carboxylic acid, epoxide, isocyanate, and other polymerizable groups known in the art (such as those produced by condensation of carboxylic acids with alcohols or amines to form polyesters or polyamides). Polymerization using reactive end groups is well-known in the art. Click chemistry (developed in the Sharpless group at The Scripps Research Institute) utilizes the copper (I) triazole formation from alkynes and azides, a highly efficient reaction (Wang, Q.; Chan, T. R.; Hilgraf, R.; Fokin, V. V.; Sharpless, K. B.; Finn, M. G. "Bioconjugation by Copper(I)-Catalyzed Azide-Alkyne [3+2] Cycloaddition", *J. Am. Chem. Soc.* 2003, 125, 3192). There is growing interest in "click" chemistry in many applications; the triazole products can associate with biological agents through dipole interactions and hydrogen bonding (Kolb, H. C.; Sharpless, K. B. "The Growing Impact of Click Chemistry in Drug Discovery" *Drug Discov. Today* 2003, 8(24), 1128-1137), As used herein, "therapeutic agent" includes those groups that cause a measurable physiological response in a mammal. The mammal may be human or non-human. Therapeutic agents are known in the art. All categories and specific therapeutic agents are intended to be included in this disclosure, even if not specifically mentioned. Therapeutic agents include enzymes, antibiotics, anesthetics, antibodies, growth factors, proteins, hormones, anti-inflammatories, analgesics, cardiac agents, and psychotropics.

As used herein, "caged groups" include those groups which may be activated upon photodegradation to elicit a fluorescent and/or chromagenic response, or a response that is detectable by other conventional analytical techniques. Caged groups can be attached to the photodegradable group, the end group, the backbone, or any other portion of the macromer. In one embodiment, caged groups are activated (have a different fluorescence or absorbance than when caged) upon photocleavage. This allows tracking of the progress of the photodegradation reaction. Fluorescein, bromohydroxycoumarin, fluorescent dyes and groups known in the art to be susceptible to two-photon photolysis are some useful caged groups, although there are other useful caged groups that are known in the art and that are intended to be included in this disclosure.

Any or all of the groups of the macromers of the invention can be attached to each other directly or through a linker to any other group in any desired order. Linkers are known in the art and include such groups as alkyl chains which may be optionally substituted with heteroatoms such as oxygen, carbonyl groups, aldehyde groups, ketone groups, halogens, nitro groups, amide groups, and combinations thereof, as well as any group that does not prevent the desired reaction from occurring.

The macromers of the invention may be copolymerized with other monomers, macromomers or reactive compounds. The macromers of the invention may be grafted on or reacted with surfaces, such as biological implants or surfaces coated with a biocompatible substance. In one embodiment of the invention, the macromers and polymers of the invention are formed and/or degraded in the presence of any biologically compatible material, such as proteins, carbohydrates, nucleic acids, organic and inorganic biologically active materials, tissues and tissue aggregates.

DETAILED DESCRIPTION OF THE INVENTION

The following non-limiting description is intended to further illustrate some embodiments of the invention.

Figure 1:
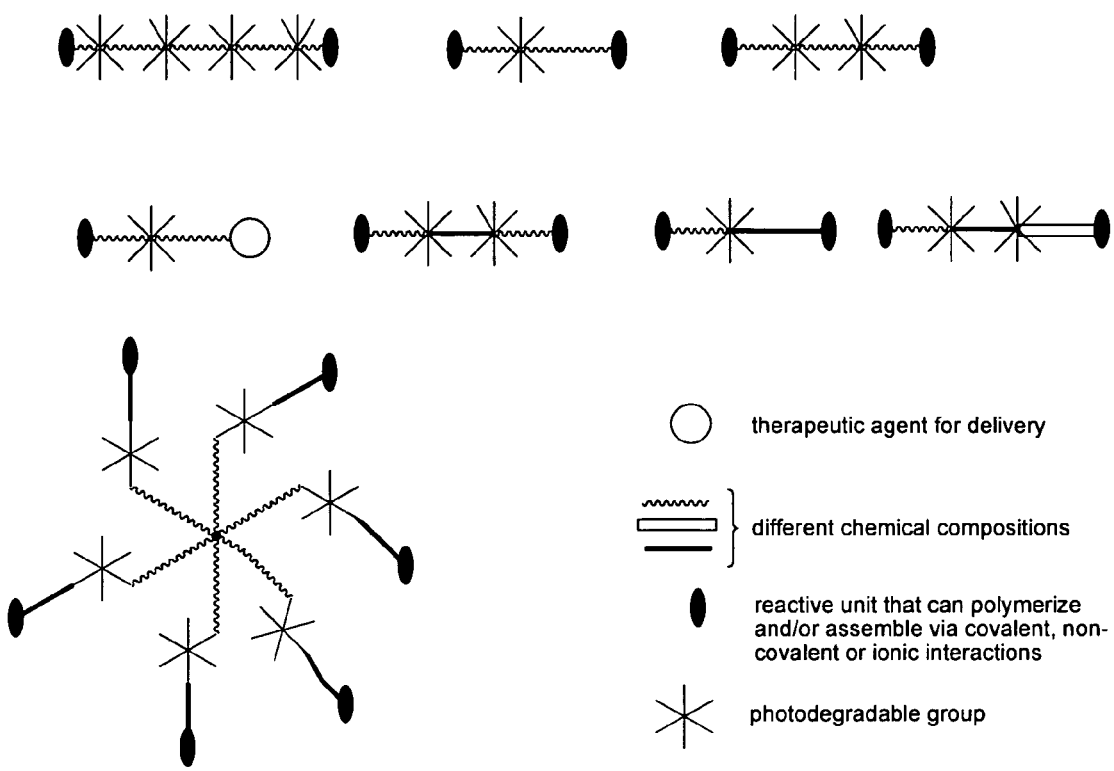
FIG. 1 shows some different examples of structures of the invention.

FIG. 1 shows some exemplary structures into which photodegradable groups can be incorporated according to the invention. Photodegradable groups can be incorporated into macromers, block copolymers, and linear and branched polymers, for example. They can be incorporated between a reactive end group, such as an olefin, and a therapeutic agent, for incorporation into a tissue scaffold to provide spatial and temporal control over the release of the agent. Photodegradable groups can be incorporated into linear structures and crosslinked structures to allow rapid and precise degradation of higher molecular weight materials. The macromers can form or be incorporated into networks via covalent, non-covalent and/or ionic interactions, as known in the art. These networks can be used for 3-D photolithography via single and multi-photon photolysis. Thin films of reacted macromers can be cast and then degraded for 2-D lithography. Incorporation of a chromagenic or fluorescent group (caged group) into the photodegradable linkage that is activated upon degradation allows for 2-D and 3-D imaging. The chromagenic or fluorescent group can be detected using any available technique.

The macromers can be amphiphilic, incorporating both hydrophobic and hydrophilic segments, or can be hydrophilic or hydrophobic. The macromers can be linear or branched, and can form linear, branched or crosslinked networks which are then photodegradable. These macromers can be incorporated or grafted onto surfaces to impart biocompatibility. The polymers and polymer networks formed from these macromers can, for example, undergo bulk degradation, surface degradation, gradient degradation and/or focused degradation that is spatially controllable. Multiple photodegradable groups which degrade at different wavelengths with or without a photosensitizer allows for multistage degradation, including surface and bulk patterning and spatial control over release of multiple groups. This can be used to control the timing and spatial release of therapeutics in different parts of the body, for example. The compositions of the invention can be combined with groups that undergo existing methods of degradation, such as hydrolysis or enzymatic degradation.

Incorporation of different photodegradable groups that photolyze at different wavelengths in one macromer or different macromers that are incorporated into a network allows a broad range of wavelengths to be used for photodegradation (such as those wavelengths $\geq 300$ nm (including light around 365 nm) but preferably in the longwave ultra-violet to visible light region for biological applications (because shorter wavelengths such as 280 nm cause mutations, damage and/or cell death) and intensities, and allows for multi-stage degradation where the degradation is temporally controlled by the timing of the application of the appropriate cleaving photoradiation for each different photodegradable group, dual degradation of different photodegradable groups by the simultaneous application of different cleaving photoradiation for each photodegradable group and/or release of desired substances. The degradation of one photodegradable group at one wavelength can be simultaneous with or at a different time than the degradation of another photodegradable group at a different wavelength by application of the appropriate wavelength.

Figure 2:
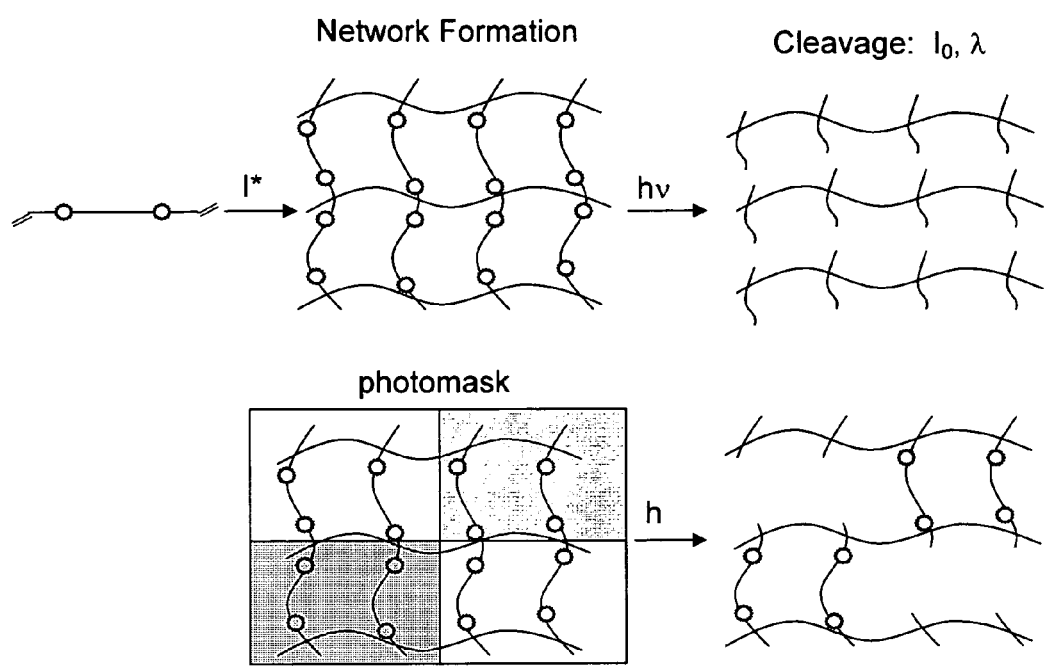
FIG. 2 shows a general description of the formation and cleavage of networks of macromers of the invention.

FIG. 2 shows one general description of the formation and cleavage of networks of macromers of the invention. A network is formed by the reaction of multiple photodegradable macromers with reactive end groups. Upon application of the appropriate wavelength and intensity of light, the photodegradable groups cleave (top of FIG. 2). Portions of the network can be masked using any material that the light does not penetrate, such as foil, a transparency film with printed black areas in a desired arrangement, or other masking materials known in the art, allowing the desired patterning of cleaved groups and uncleaved groups (bottom of FIG. 2). Sequential photodegradation of unmasked portions and masked portions then occurs by application of the appropriate wavelength.

Figure 3:
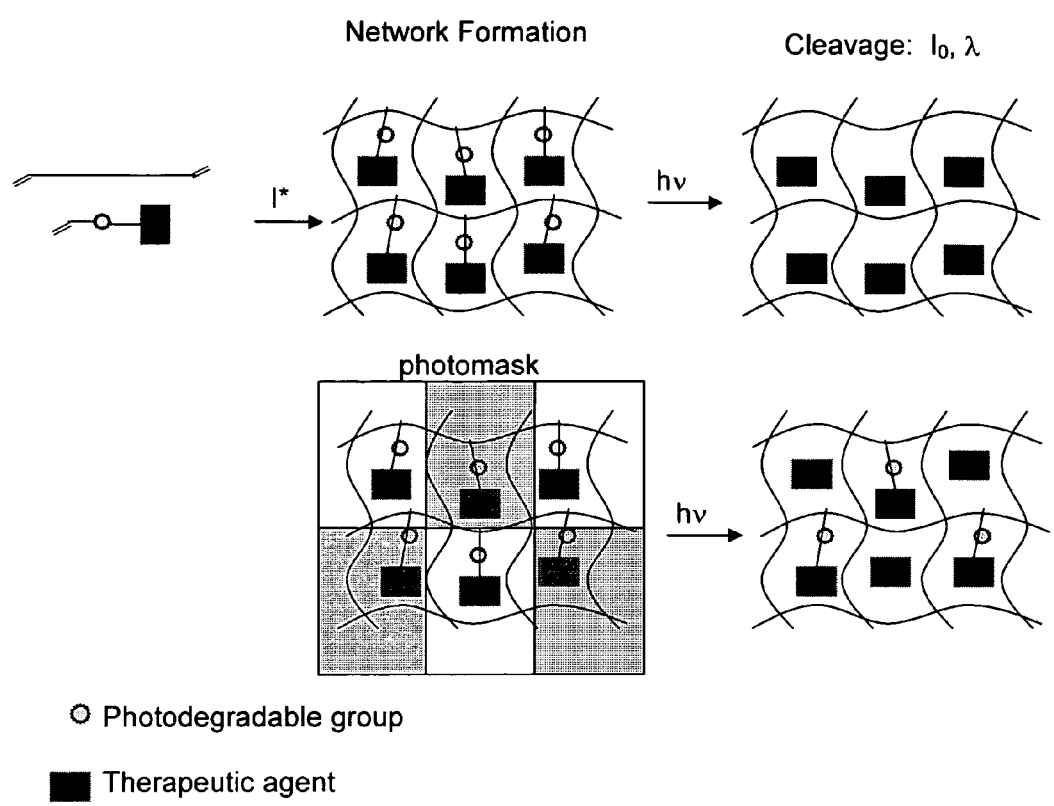
FIG. 3 shows a general description of the release of a therapeutic agent.

FIG. 3 shows one application of the invention using a therapeutic agent. As in FIG. 2, a network of photodegradable groups having therapeutic agents attached thereto is formed. As shown in FIG. 3, the network can be formed using different precursors, some having photodegradable groups with optional therapeutic agents which may be the same or different, and some not having photodegradable groups, allowing for the desired network composition. Upon application of light having the appropriate intensity and wavelength, the photodegradable groups cleave. Different photodegradable groups can be incorporated into the network to allow for degradation of different photodegradable groups with different light wavelengths. As shown in the bottom of FIG. 3, using a photomask, some of the photodegradable groups can be allowed to cleave upon the initial application of light and others can remain uncleaved. This allows the release of a portion of the therapeutic agent at one time and allows the release of a different portion of the therapeutic agent at a different time. Various combinations of therapeutic agents, caged groups, photodegradable groups, masks and other components can be used to provide the desired release profile by one of ordinary skill in the art without undue experimentation using the knowledge in the art and provided herein.

SYNTHESIS EXAMPLES

Techniques. All reactions were performed under an argon atmosphere using a Schlenk line unless noted otherwise. $^1$H NMR spectra (δ, ppm) were recorded on either a Varian Inova 400 (400 MHz) spectrometer. All spectra were recorded in CDCl$_3$ with tetramethylsilane (TMS) as an internal standard unless noted otherwise.

A general synthetic route to form photodegradable groups is shown in Scheme 1:

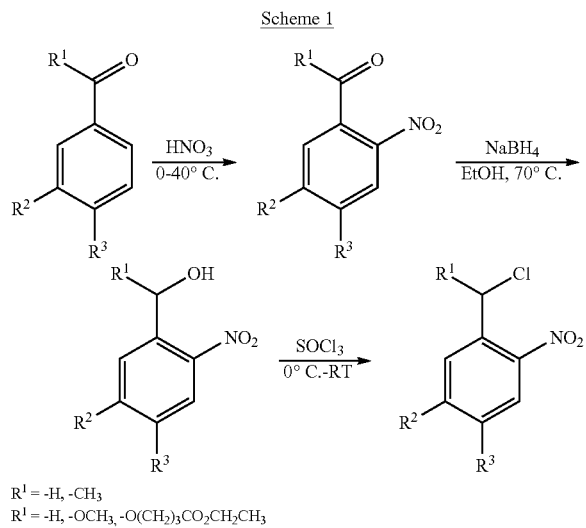

$R^1$ = -H, -CH$_3$
$R^1$ = -H, -OCH$_3$, -O(CH$_2$)$_3$CO$_2$CH$_2$CH$_3$
$R^1$ = -O(CH$_2$)$_3$CO$_2$CH$_2$CH$_3$, -(CH$_2$)$_3$CO$_2$CH$_2$CH$_3$

The structures can be functionalized with reactive end groups using methods known in the art and described herein. In several of the schemes and compounds shown herein, the backbone group is shown in parenthesis without a number of repeating units specified. This structural information indicates the number of repeating units may be as many or as few as desired, as long as the structure functions in the desired way. As known in the art, compounds can be synthesized in different ways, as exemplified below.

Synthesis of the photodegradable group, poly(ethylene glycol) monoacrylate-4-(2-methoxy-5-nitro-4-(2-bromoethyl)phenoxy butanoate, is shown in Scheme 2. Acetovanillone was esterified with ethyl 4-bromobutyrate, and the resulting keto-ester converted to the oxime using hydroxylamine hydrochloride in pyridine. The oxime was then reduced to the amine using zinc in acetic acid, and the resulting amine protected with trifluoroacetic anhydride to yield ethyl 4-(2-methoxy-4-(1-trifluoroacetamidoethyl)phenoxy) butanoate. After nitration with nitric acid, the trifluoroacetamide group was removed under basic conditions. Ethyl 4-(2-methoxy-4-(2-aminoethyl)phenoxy)butanoate was converted to the bromide via diazotization using sodium nitrite in hydrobromic acid, while the ethyl ester was simultaneously cleaved, to yield 4-(2-methoxy-4-(2-bromoethyl) phenoxy)butanoic acid. This acid is converted to the acid chloride using thionyl chloride and used to esterify poly(ethylene glycol) monoacrylate.

In this example, the backbone is poly(ethylene glycol) and the reactive end group is acrylate. The bromide/chloride group allows for substitution reactions known in the art to make ethers and amides (and also thioesters).

Scheme 2.
Synthesis of poly(ethylene glycol) monoacrylate-4-(2-methoxy-5-nitro-4-(2-bromoethyl)phenoxy butanoate).

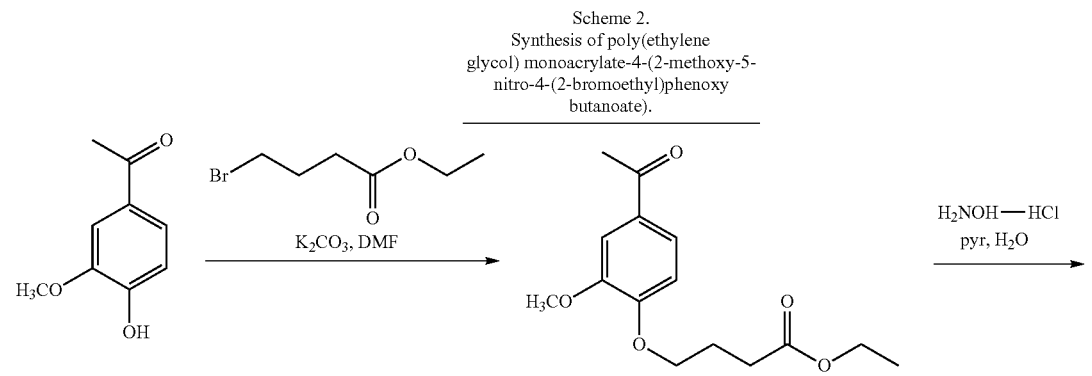

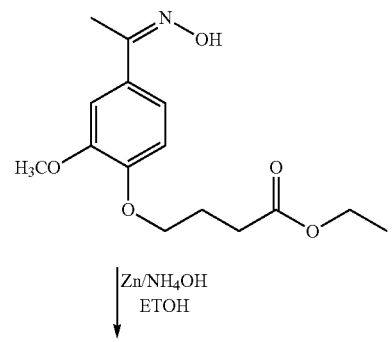

-continued
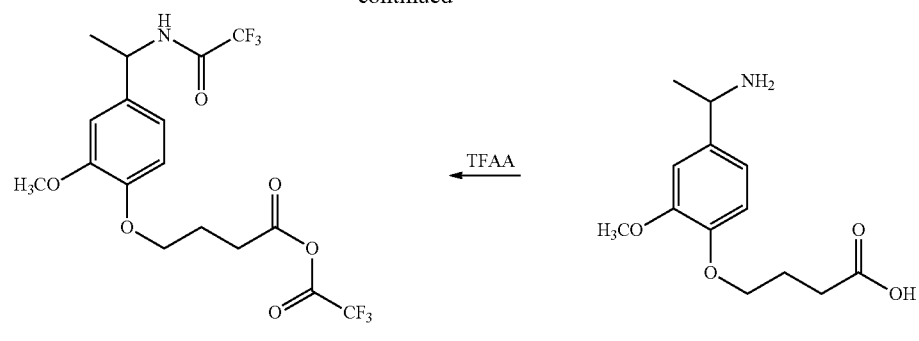
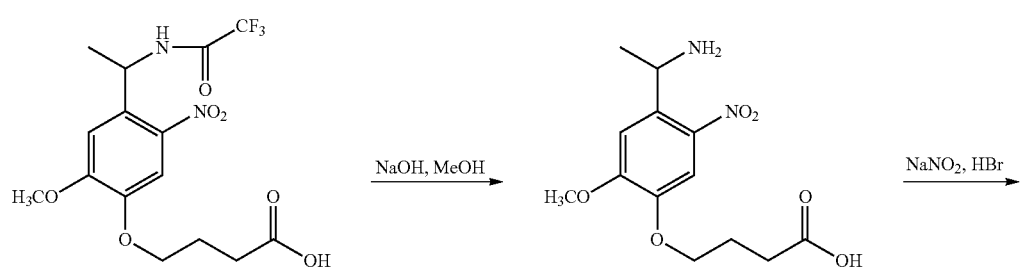
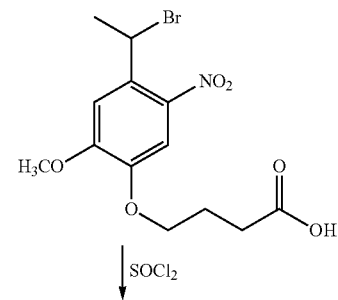
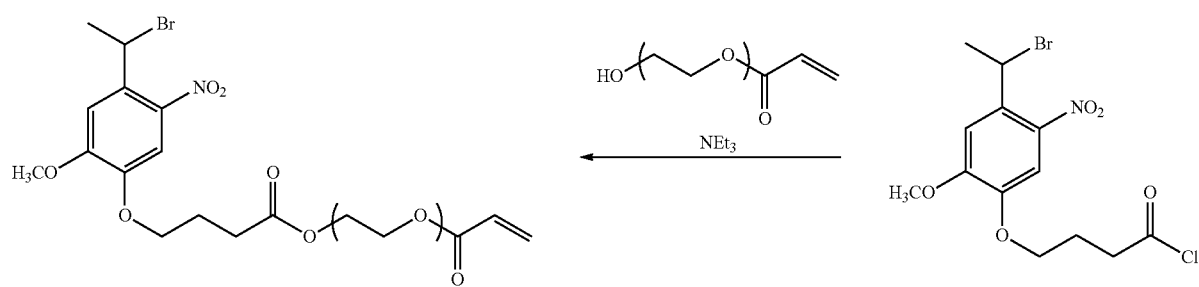

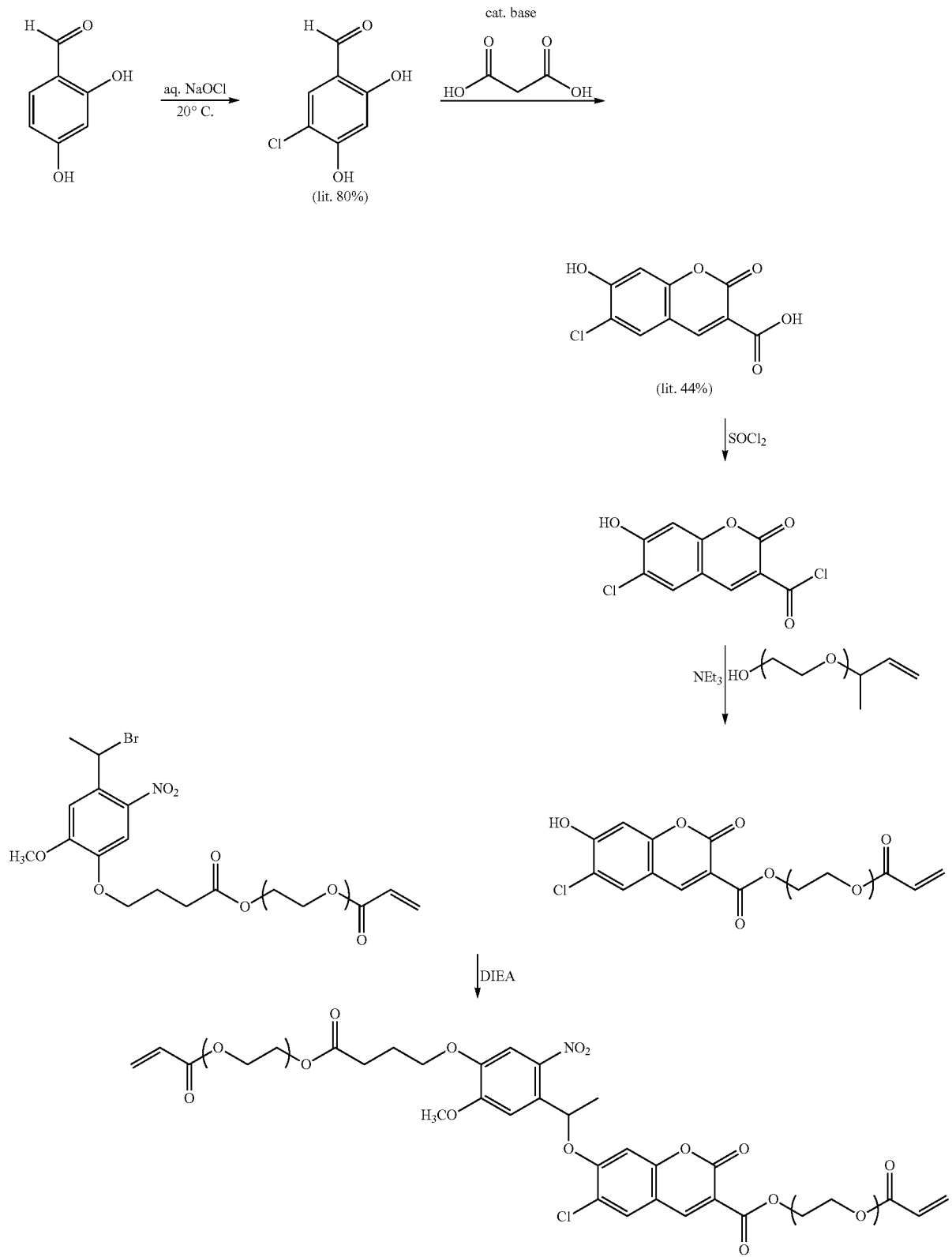
Scheme 3.
Synthesis of poly(ethylene glycol) monoacrylate 6-chloro-7-hydroxycoumarin-3-carboxylate.

Synthesis of a fluorophore that is subsequently coupled to a photodegradable group for degradation via single and 2-photon photolysis is shown in Scheme 3. The fluorophore, poly(ethylene glycol) monoacrylate 6-chloro-7-hydroxycoumarin-3-carboxylate, was synthesized by chlorination of 2,4-dihydroxy benzaldehyde using sodium hypochlorite under acidic conditions. The resulting 5-chloro-2,4-dihydroxybenzaldehyde was condensed with malonic acid catalyzed by aniline to obtain 6-chloro-7-hydroxycoumarin-3-carboxylate, which was converted to the acid chloride using thionyl chloride, and used to esterify poly(ethylene glycol) monoacrylate (Scheme 3).

Synthesis of the photodegradable group, poly(ethylene glycol) monoacrylate-4-(2-methoxy-5-nitro-4-(2-chloroethyl)phenoxy butanoate, is shown in Scheme 4.

Synthesis of ethyl 4-(4-ethanoyl-2-methoxyphenoxy). Acetovanillone (16.6 g, 0.10 mol), potassium carbonate (30.0 g, 0.22 mol) and ethyl-4-bromobutyrate (17 mL, 0.12 mol) were combined in dimethylformamide (50 mL) and stirred under Argon for 17.5 h. The reaction was poured into water (800 mL) and stirred for 24 h. The product was isolated by filtration to yield ethyl 4-(4-ethanoyl-2-methoxyphenoxy) butanoate (27.5 g, 98%) as a white powder. $^1$H NMR ($\delta$, ppm): 1.28 (t, $CO_2CH_2CH_3$), 2.21 (p, $ArOCH_2CH_2CH_2$), 2.56 (t, $ArOCH_2CH_2CH_2$), 2.60 (s, $ArCOCH_3$), 3.92 (s, $ArOCH_3$), 4.13 (t, $ArOCH_2$), 4.18 (q, $CO_2CH_2$), 6.92 (d, aromatic H ortho to $ArOCH_2$), 7.54 (s, aromatic H ortho to $ArOCH_3$), 7.58 (d, aromatic H ortho to $ArCOCH_3$).

Synthesis of ethyl 4-(4-ethanoyl-2-methoxy-5-nitrophenoxy)butanoate. 70% Nitric acid (60 mL) was cooled in an ice bath. Ethyl 4-(4-ethanoyl-2-methoxylphenoxy)butanoate (21 g, 0.075 mol) was added in portions over 20 minutes. The solution was stirred for 1.5 h while monitoring the temperature, which did not rise above 22° C. The solution was cautiously poured into water (800 mL), which was then cooled to 4° C. for several hours. The product was collected via filtration and recrystallized from ethanol (250 mL) to yield ethyl 4-(4-ethanoyl-2-methoxy-5-nitrophenoxy)butanoate (11.04 g, 45.3%) as a yellow flocculent powder. $^1$H NMR ($\delta$, ppm): 1.31 (t, $CO_2CH_2CH_3$), 2.21 (p, $ArOCH_2CH_2CH_2$), 2.52 (s, $ArCOCH_3$), 2.56 (t, $ArOCH_2CH_2CH_2$), 3.98 (s, $ArOCH_3$), 4.19 (m, $ArOCH_2$ and $CO_2CH_2$), 6.76 (d, aromatic H ortho to $ArOCH_2$), 7.65 (s, aromatic H ortho to $ArOCH_3$).

Synthesis of ethyl 4-(4-(1-hydroxyethyl)-2-methoxy-5-nitrophenoxy)butanoic acid. Sodium borohydride (0.8 g 0.084 mol hydride) was added in portions to ethyl 4-(4-ethanoyl-2-methoxy-5-nitrophenoxy)butanoate (10.8 g, 0.033 mol) dissolved in ethanol (200 mL) under argon. After 24 h, TLC (10:1 $CH_2Cl_2$:acetone eluent) indicated incomplete conversion. The reaction was warmed gently and additional sodium borohydride (0.2 g 0.021 mol hydride) was added. After 24 hours, the reaction was poured into water (800 mL) and a yellow precipitate formed. The precipitate was isolated via filtration to yield 4-(4-(1-hydroxyethyl)-2-methoxy-5-nitrophenoxy)butanoate as a yellow powder, and used without further purification. $^1$H NMR ($\delta$, ppm): 1.29 (t, $CO_2CH_2CH_3$), 1.59 (d, $CHCH_3$), 2.23 (p, $ArOCH_2CH_2CH_2$), 2.58 (t, $ArOCH_2CH_2CH_2$), 4.00 (s, $ArOCH_3$), 4.14 (m, $ArOCH_2$), 4.20 (q, $CO_2CH_2$), 5.59 (q, $CHCH_3$), 7.32 (d, aromatic H ortho to $ArOCH_2$), 7.60 (s, aromatic H ortho to $ArOCH_3$). The 4-(4-(1-hydroxyethyl)-2-methoxy-5-nitrophenoxy)butanoate was dissolved in a mixture of trifluoroacetic acid (10 mL) and water (100 mL) and heated to 80° C. for 18 h, at which point $^1$H NMR indicated incomplete conversion. Additional TFA (5 mL) was added, and the reaction was continued for 24 h. After 24 h, the reaction was cooled to room temperature to form a precipitate which was collected via filtration. The precipitate was lyophilized to yield 4-(4-(1-hydroxyethyl)-2-methoxy-5-nitrophenoxy)butanoic acid (8.53 g (86%) as a yellow powder. $^1$H NMR ($\delta$, ppm, acetone d-6): 1.53 (d, $CHCH_3$), 2.12 (p, $ArOCH_2CH_2CH_2$), 2.55 (t, $ArOCH_2CH_2CH_2$), 4.03 (s, $ArOCH_3$), 4.16 (m, $ArOCH_2$), 5.47 (q, $CHCH_3$), 7.47 (d, aromatic H ortho to $ArOCH_2$), 7.59 (s, aromatic H ortho to $ArOCH_3$).

Synthesis of 4-(4-(1-chloroethyl)-2-methoxy-5-nitrophenoxy)butanoyl chloride. 4-(4-(1-Hydroxyethyl)-2-methoxy-5-nitrophenoxy)butanoic acid (1.72 g, 5.76 mmol) was added all at once to a solution of methylene chloride (15 mL), dimethylformamide (1 drop) and thionyl chloride (2.2 mL, 0.030 mol) to form a heterogenous solution. After three hours, the solution became homogenous. The methylene chloride was removed via rotary evaporation, and the resulting 4-(4-(1-chloroethyl)-2-methoxy-5-nitrophenoxy)butanoyl chloride was used without further purification. $^1$H NMR ($\delta$, ppm): 1.88 (d, $CHCH_3$), 2.21 (p, $ArOCH_2CH_2CH_2$), 2.56 (t, $ArOCH_2CH_2CH_2$), 4.00 (s, $ArOCH_3$), 4.13 (m, $ArOCH_2$), 5.92 (q, $CHCH_3$), 7.29 (d, aromatic H ortho to $ArOCH_2$), 7.51 (s, aromatic H ortho to $ArOCH_3$).

Synthesis of bis-4-(4-(1-chloroethyl)-2-methoxy-5-nitrophenoxy)butanoyl-poly(ethylene glycol). 4-(4-(1-chloroethyl)-2-methoxy-5-nitrophenoxy)butanoyl chloride (1.94 g, 5.8 mmol) in methylene chloride (10 mL) was added dropwise to a solution of poly(ethylene glycol) 2000 (4.8 g, 2.4 mmol) and triethylamine (1 mL, 7.1 mmol) while cooling to 0° C. After 12 hours, the product was precipitated into cold (0° C.) diethyl ether (500 mL) and collected via filtration to yield bis-4-(4-(1-chloroethyl)-2-methoxy-5-nitrophenoxy)butanoyl-poly(ethylene glycol) (6.05 g, 81%).

Scheme 4.
Synthesis of poly(ethylene glycol) monoacrylate-4-(2-methoxy-5-nitro-4-(2-chloroethyl)phenoxy butanoate

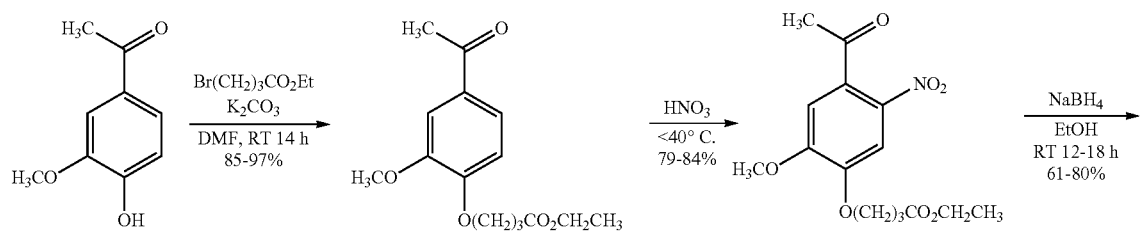

-continued

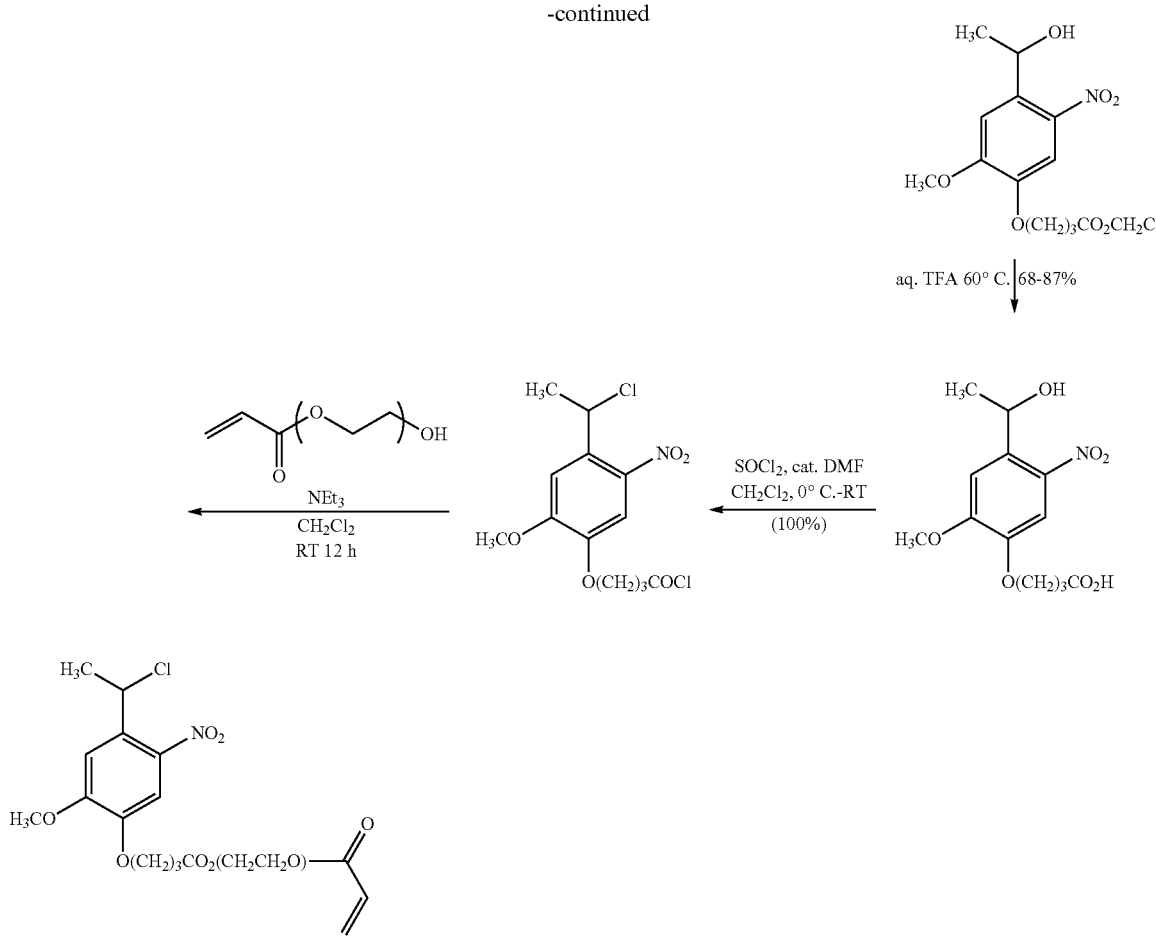

The synthesis of fluorescein poly(ethylene glycol) monoacrylate, is shown in Scheme 5.

Synthesis of Poly(ethylene glycol) acrylate succinate. Poly (ethylene glycol) 375 acrylate (5.6 g, 15 mmol) and DMAP (0.25 g, 2.0 mmol) were dissolved in chloroform (100 mL). Succinic anhydride (1.8 g, 18 mmol) was added in portions. The reaction was heated to reflux for 14 h. After cooling the reaction mixture was washed with dil. aq. HCl (2×50 mL) and dried over sodium sulfate. The solvent was removed via rotary evaporation to yield poly(ethylene glycol) acrylate succinate (6.6 g, 92%) as a viscous oil.

Synthesis of Poly(ethylene glycol) acrylate succinyl fluorescein. Poly(ethylene glycol) acrylate succinate (5.2 g, 11 mmol), fluorescein (9.1 g, 27 mmol), dimethylaminopyridine (0.077 g, 0.6 mmol) and dicyclohexylcarbodiimide (2.7 g, 13 mmol) were dissolved in 95 mL THF and stirred at room temperature under argon for 22 h. The THF was removed via rotary evaporation and the mixture precipitated into methylene chloride. Excess fluorescein was removed via filtration, and the solvent removed via rotary evaporation. The crude product was taken into chloroform, filtered and concentrated five times to remove excess fluorescein, and the same procedure was repeated using acetone, as fluorescein has lo solubility in both chloroform and acetone. The solvent was removed via rotary evaporation to yield poly(ethylene glycol) acrylate succinyl fluorescein.

Scheme 5.
Synthesis of poly(ethylene glycol) monoacrylate fluorescein.

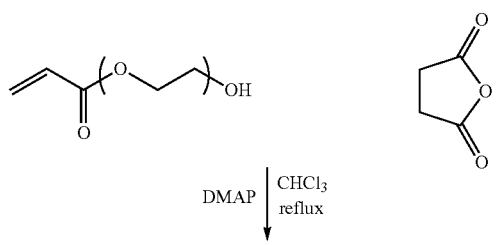

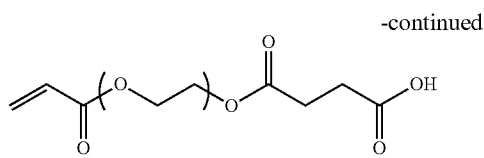
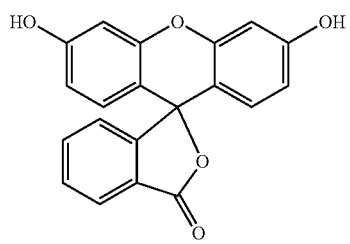

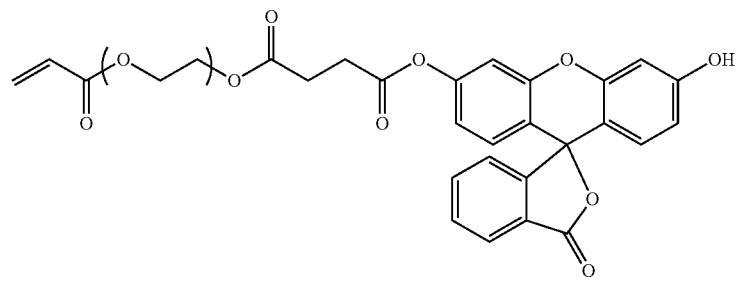

The synthesis of 6-chloro-7-hydroxy-3-coumarin carboxylic acid is shown in Scheme 6.

Synthesis of 5-chloro-2,4-dihydroxybenzaldehyde. Sodium hypochlorite (75 mL, 0.055 mol) and piperidine (4.68 g, 0.055 mol) were cooled to 0° C., combined cautiously and added dropwise over 2 h to a solution of 2,4,-dihydroxybenzaldehyde (6.91 g, 0.05 mol) in 50% aqueous sulfuric acid (150 mL) while cooling to 0° C. After three additional hours, the precipitate was collected via filtration in quantitative yield. $^1$H NMR indicates that it is about 65% 5-chloro-2,4-dihdroxybenzaldehyde, with the balance being 3-chloro-2,4-dihdroxybenzaldehyde. The product can be purified via column chromatography and/or repeated recrystallizations from toluene. However, the 3-chloro-2,4-dihdroxybenzaldehyde does not react in the next reaction, so the product was used without further purification.

Synthesis of 6-chloro-7-hydroxycoumarin-3-carboxylate. Chloro-2,4-dihdroxybenzaldehyde (mixture of 3- and 5-isomers, 6.59 g, 0.038 mol), malonic acid (8.02 g, 0.077 mol) and aniline (1 mL) were combined in pyridine (30 mL) and stirred at RT. After 3 d, the reaction was acidified using HCl and the product was collected via filtration to yield 6-chloro-7-hydroxycoumarin-3-carboxylate (5.14 g, 55.9% overall, 86% based on starting ratio of 5-chloro-2,4-dihydroxybenzaldehyde) as a yellow powder.

Synthesis of poly(ethylene glycol) bis-6-chloro-7-hydroxycoumarin-3-carboxylate. 6-Chloro-7-hydroxycoumarin-3-carboxylate (2 equivalents) dicyclohexylcarbodiimide (2.5 equivalents), dimethylaminopyridine (0.1 equivalent), and poly(ethylene glycol) (molecular weight=2000 g/mol, 1 equivalent) were combined in methylene chloride. The reaction was allowed to stir for 18 h under argon, and then precipitated into cold diethyl ether. The precipitate was collected via filtration, dissolved in water, and purified via dialysis. The dissolved product was then lyophilized to yield poly(ethylene glycol) bis-6-chloro-7-hydroxycoumarin-3-carboxylate as a bright yellow solid.

Scheme 6.
Synthesis of 6-chloro-7-hydroxy-3-coumarin carboxylic acid, and the coupling of 6-chloro-7-hydroxy-3-coumarin caboxylic acid with poly(ethylene glycol) and poly(ethylene glycol) monoacrylate.

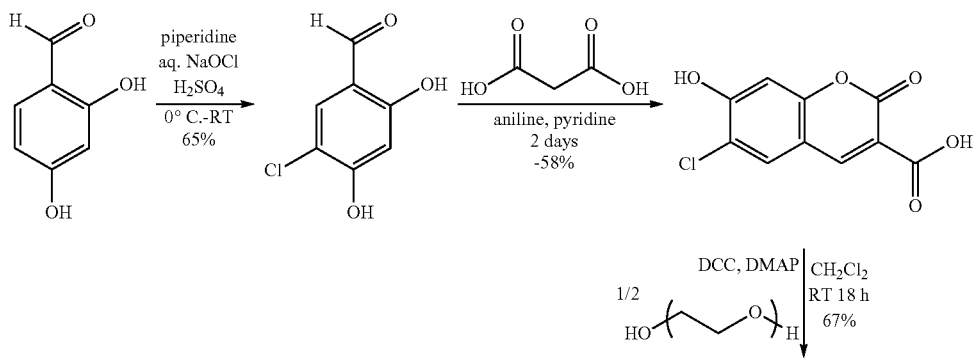

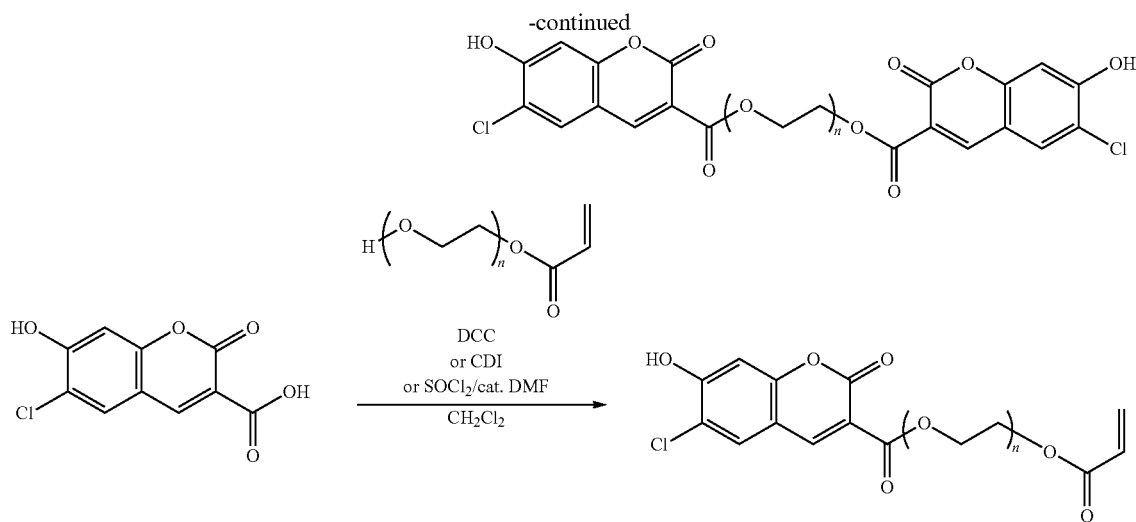

The photodegradable group can be coupled with compounds such as therapeutic agents, fluorophores, or chromagenic agents, for release upon photodegradation. Some examples are shown in Scheme 7-12.

General procedure for coupling compounds to poly(ethylene glycol) with attached photodegradable group(s): The compound of interest, which has a free hydroxyl group is dissolved in THF and deprotonated with sodium hydride. The PEG with attached photodegradable group is added dropwise to the solution, which is then allowed to stir at room temperature and/or heated gently. After six to 24 hours, the product is precipitated into cold diethyl ether. The product may be used without further purification, or purified using dialysis.

The tethered compounds can incorporated into hydrogels or other networks or scaffolds, or linear or branched polymeric systems for controlled release. The general procedure is the same; the alcohol group of a substrate is deprotonated using sodium hydride with tetrahydrofuran as a solvent; this alkoxide ion undergoes nucleophilic substitution at the 2-chloroethyl position of the poly(ethylene glycol) monoacrylate-4-(2-methoxy-5-nitro-4-(2-chloroethyl)phenoxy butanoate to produce the photodegradable macromers. Scheme 7 shows the synthesis of tethered dexamethasone. Scheme 8 shows synthesis of photodegradable poly(ethylene glycol) diacrylate. Scheme 9 shows the synthesis of a photocaged poly(ethylene glycol) bis-coumarin. Scheme 10 shows synthesis of photocaged coumarin incorporated into a poly(ethylene glycol) diacrylate. Scheme 11 shows synthesis of photocaged fluorescein incorporated into a poly(ethylene glycol) diacrylate. Scheme 12 shows synthesis of photodegradable poly(ethylene glycol) diacrylate that releases poly(ethylene glycol) upon degradation.

Scheme 7.
Synthesis of tethered dexamethasone.

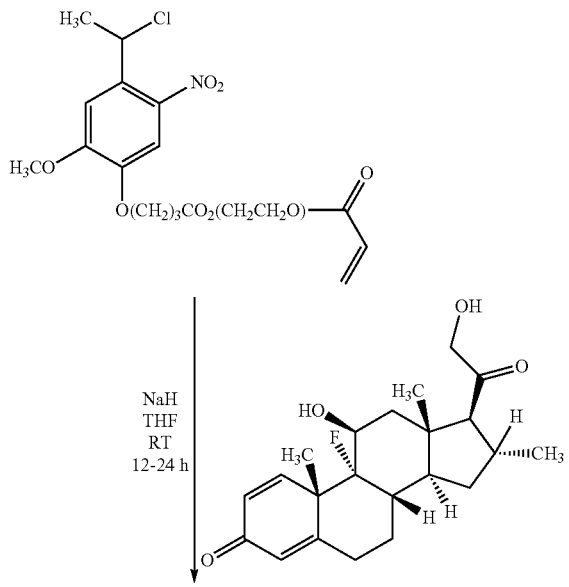

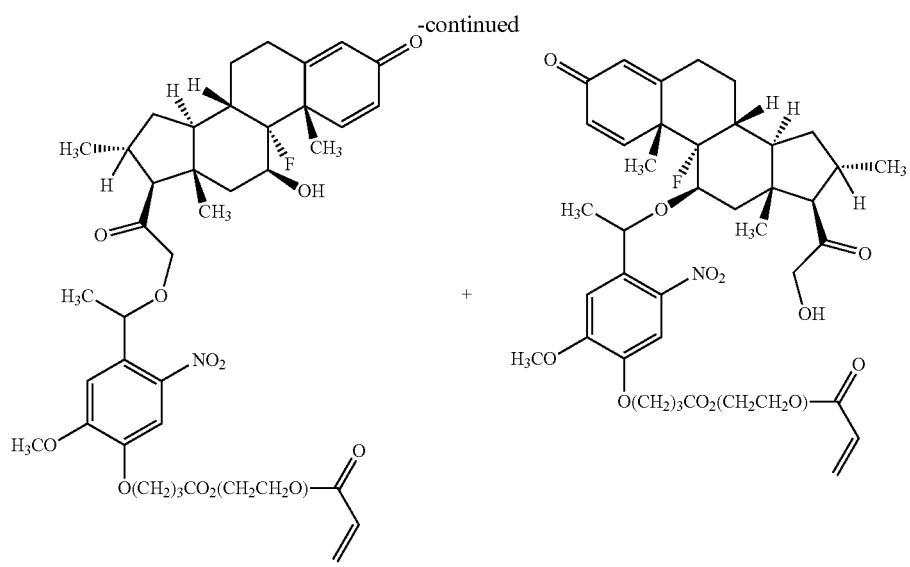
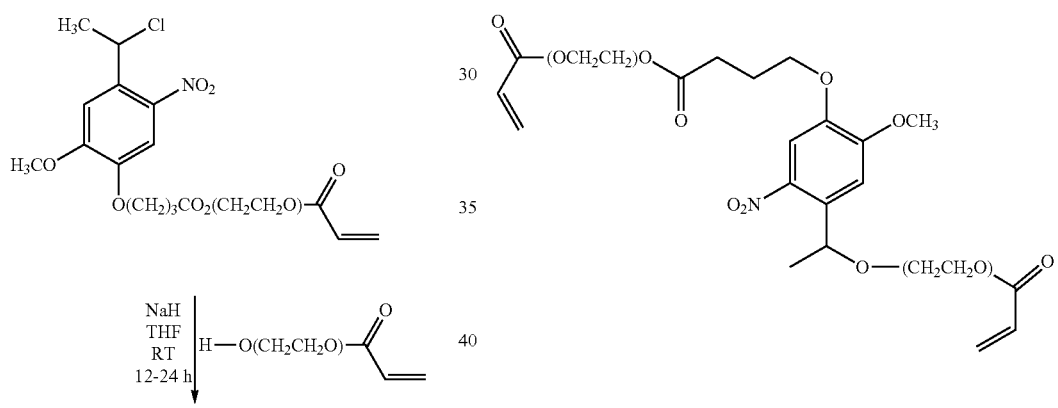
Scheme 8.
Synthesis of photodegradable poly(ethylene glycol)diacrylate.
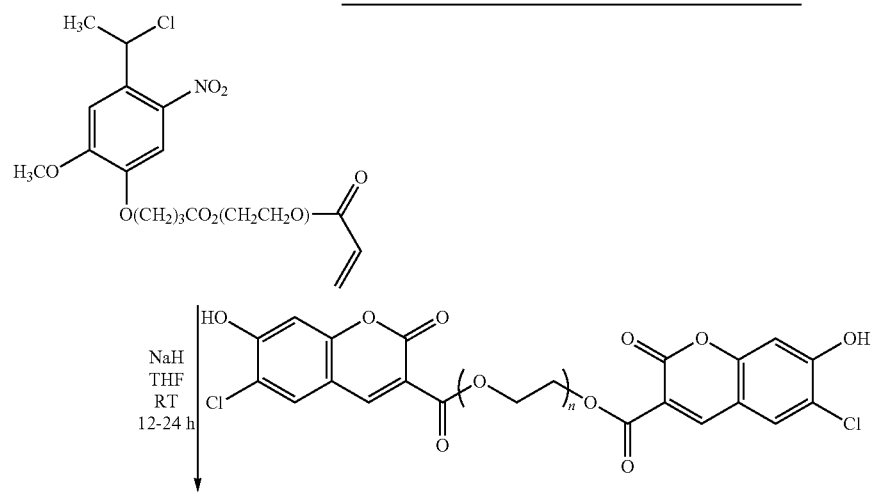
Scheme 9.
Synthesis of photocaged poly(ethylene glycol) bis-coumarin.

-continued
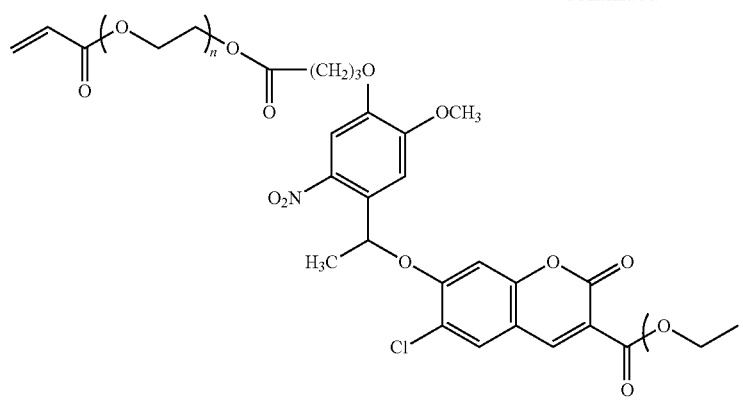
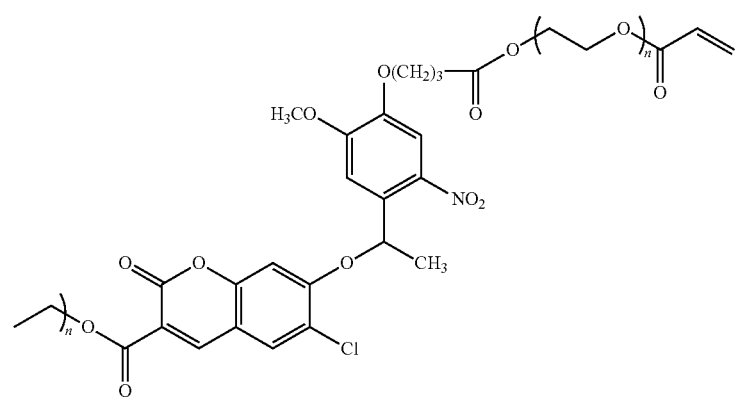
Scheme 10.
Synthesis of photocaged coumarin incorporated into a poly(ethylene glycol) diacrylate.
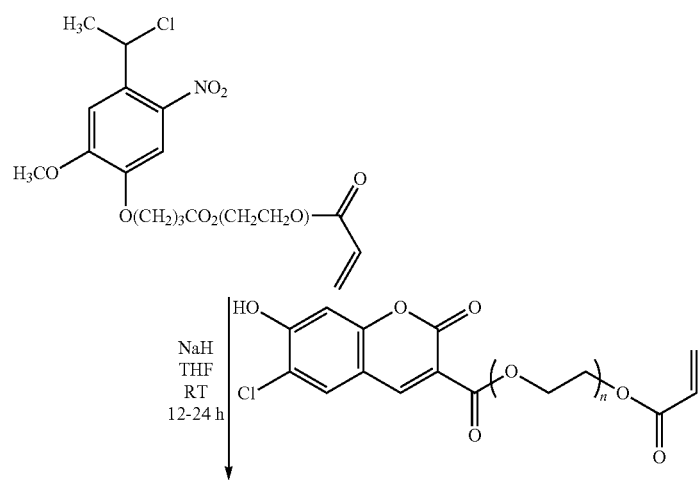

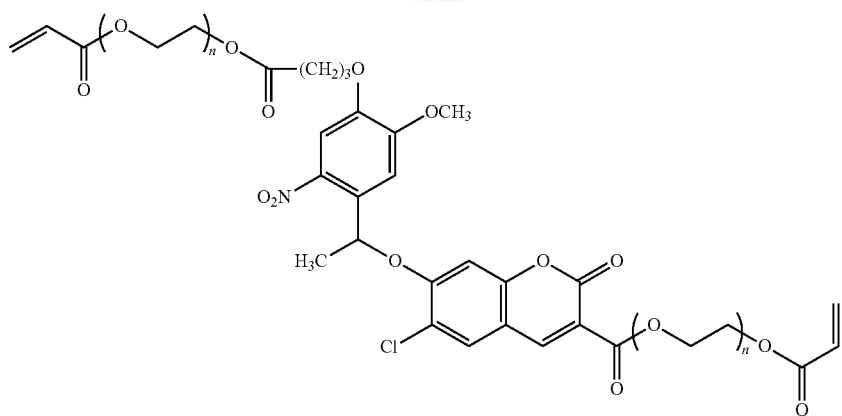
-continued
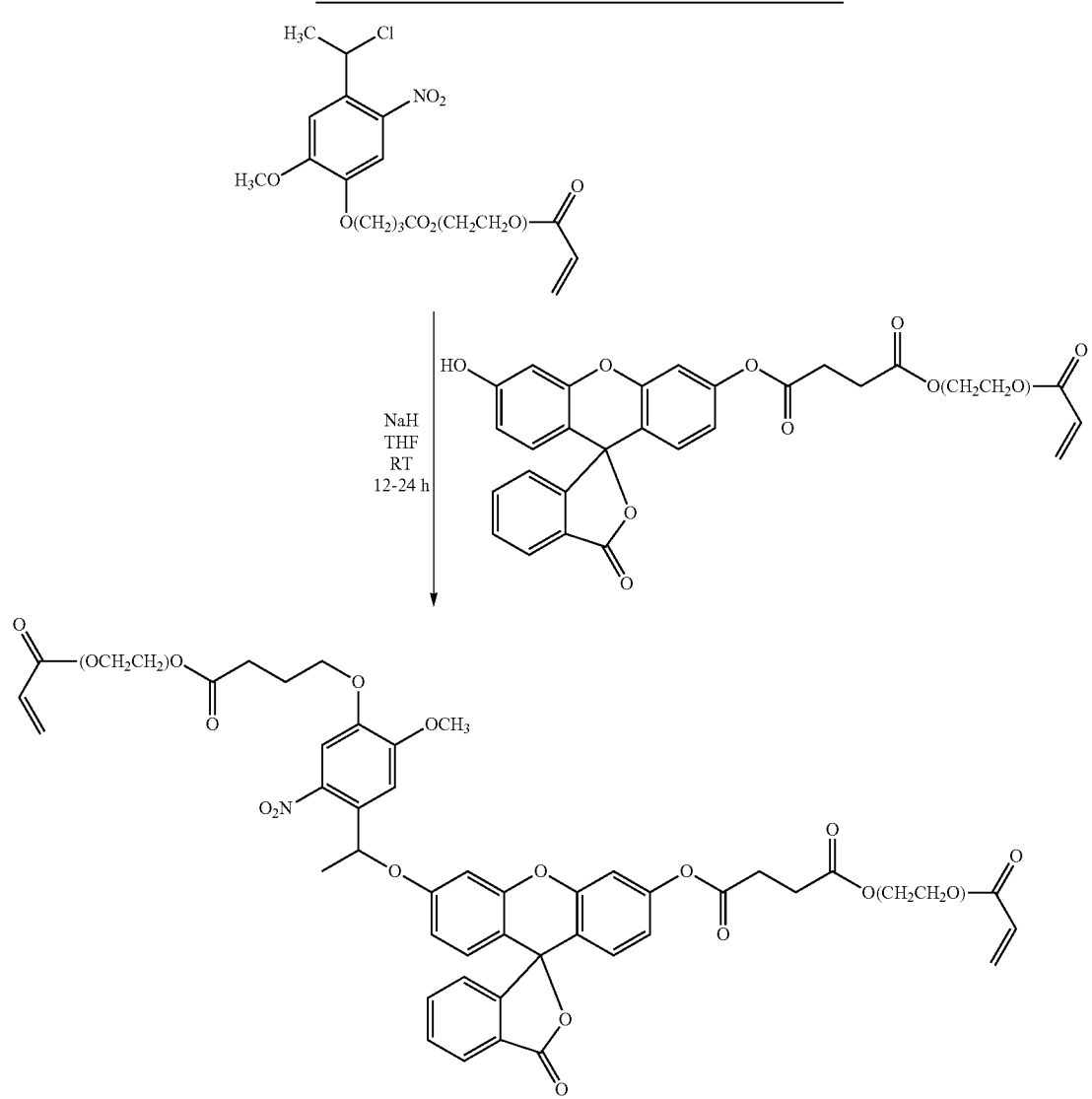
Scheme 11.
Synthesis of photocaged fluorescein incorporated into a poly(ethylene glycol) diacrylate.

Scheme 12.
Synthesis of photodegradable poly(ethylene glycol) diacrylate that releases poly(ethylene glycol) upon degradation.

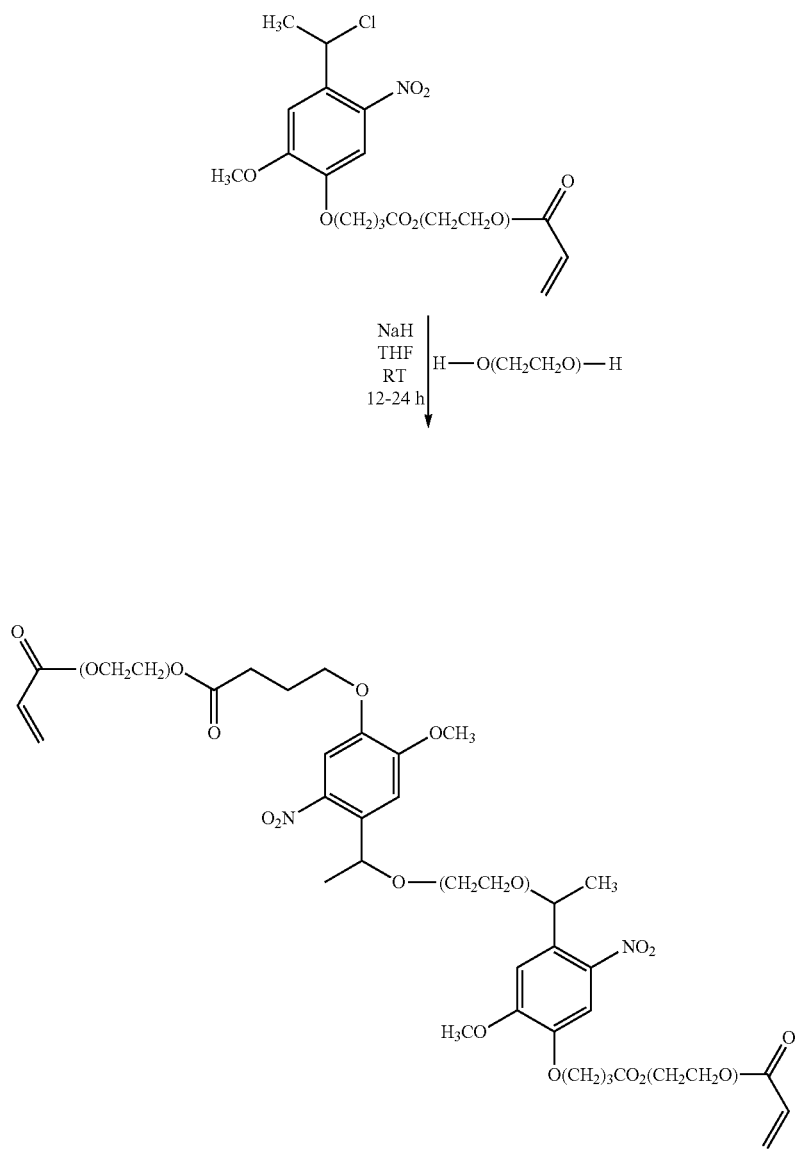

Many moieties in these chemical structures can be varied, as known in the art. For example, the poly(ethylene glycol) backbone chains can be substituted with any polymer or copolymer, as long as there is a functional group capable of reacting with the photodegradable group directly or through a suitable linker. The therapeutic agents, caged groups, reactive end groups, backbone structure and photodegradable groups can all be varied, as known in the art. The degradation rate of the photodegradable group can be tailored by changing the structure, as shown in Scheme 13, where R and R' are suitable substituents such as a caged or therapeutic group or a reactive end group or backbone, or combination thereof, with or without a linker.

Scheme 13.
Photodegradation rate changes with structure. Both axes show decreasing uncaging rate towards the arrows.

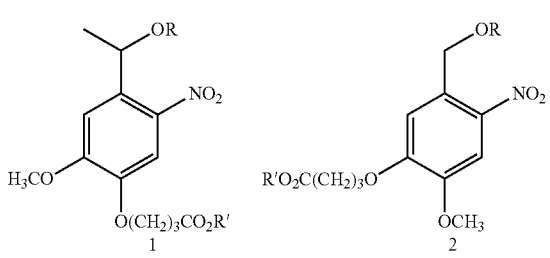

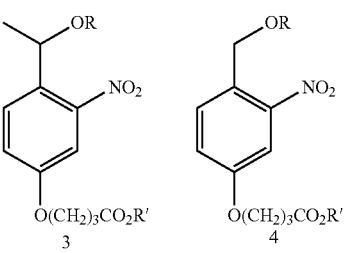

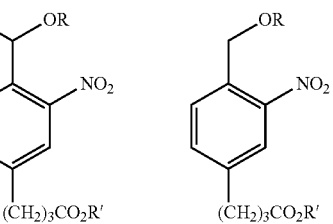

decreased uncaging rate

In the structures shown above, photodegradation occurs at the benzyl ether position; changing this from a secondary to a primary ether will change the reactivity (first column in Scheme 13 is a secondary ether, second column in Scheme 13 is a primary); decreasing the number of aryl-ether groups in the photodegradable groups also decreases the rate of photodegradation. All compounds shown in the Schemes and Figures herein can be synthesized using methods known in the art and described herein. For example, to synthesize compound 2, the same synthetic route as for compound 1 is used, but instead of acetovanillone as the starting material, 3-hydroxy-4-methoxybenzaldehyde is used. To synthesize compound 3, the same synthetic route is used, but instead of acetovanillone as the starting material, 4-hydroxyacetophenone is used. To synthesize compound 4, the same synthetic route is used, but instead of acetovanillone as the starting material, 4-hydroxybenzaldehyde is used. To synthesize compound 5, 4-bromoacetophenone can be alkylated with ethyl-4-bromobutyrate using a Negishi coupling (see below); the rest of the synthetic route is then used to obtain the product. To synthesize compound 6, 4-bromobenzaldehyde is alkylated with ethyl-4-bromobutyrate using a Negishi coupling; the rest of the synthetic route is then used to obtain the product.

Since the rates of uncaging may differ by orders of magnitude, the rate of release of a drug, for example can be tuned to the desired purpose. For example, one caged structure that uncages rapidly can be used for releasing a drug (compound having fast uncaging properties, for example compound 1 in Scheme 13), simultaneously with one for release of another drug and/or network degradation (compound having slow uncaging properties, for example, compound 6 in Scheme 13).

Simple Negishi coupling will produce the least reactive photocages:

Scheme 14

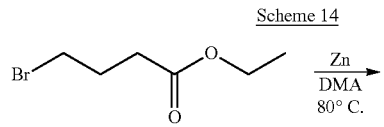

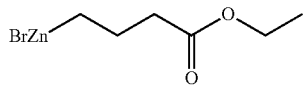

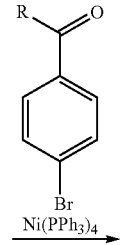

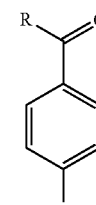

R = ——H, ——CH₃

All of the reagents used in the routes above are commercially available, but other structures, where the aryl ether (or alkyl chain) is located on a different position of the ring, can also be synthesized using methods known in the art and described herein.

Examples of Degradation

Although applicant does not wish to be bound by theory, a proposed mechanism of degradation of nitrophenylethyl based photocages is shown in Scheme 15 and is described in Zhao, et al., J. Am. Chem. Soc. (2004) 126: 4653-4663. Upon UV excitation, the substituted nitrophenylethyl groups forms an aci-nitro intermediate which decays to generate X- and 2-nitrosoacetophenone.

Scheme 15.
Degradation mechanism of nitrophenylethyl photocage.

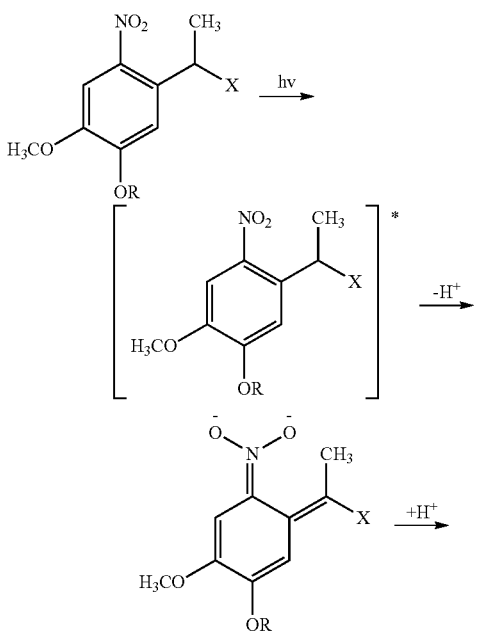

-continued

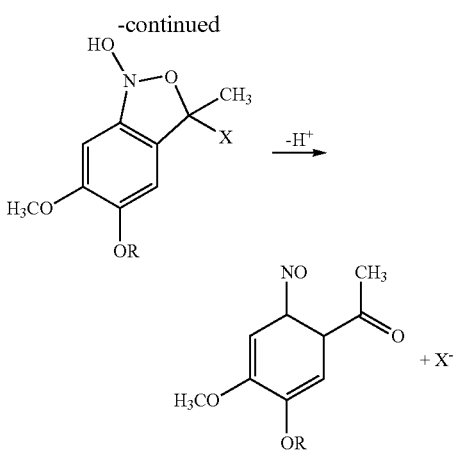

Figure 4:
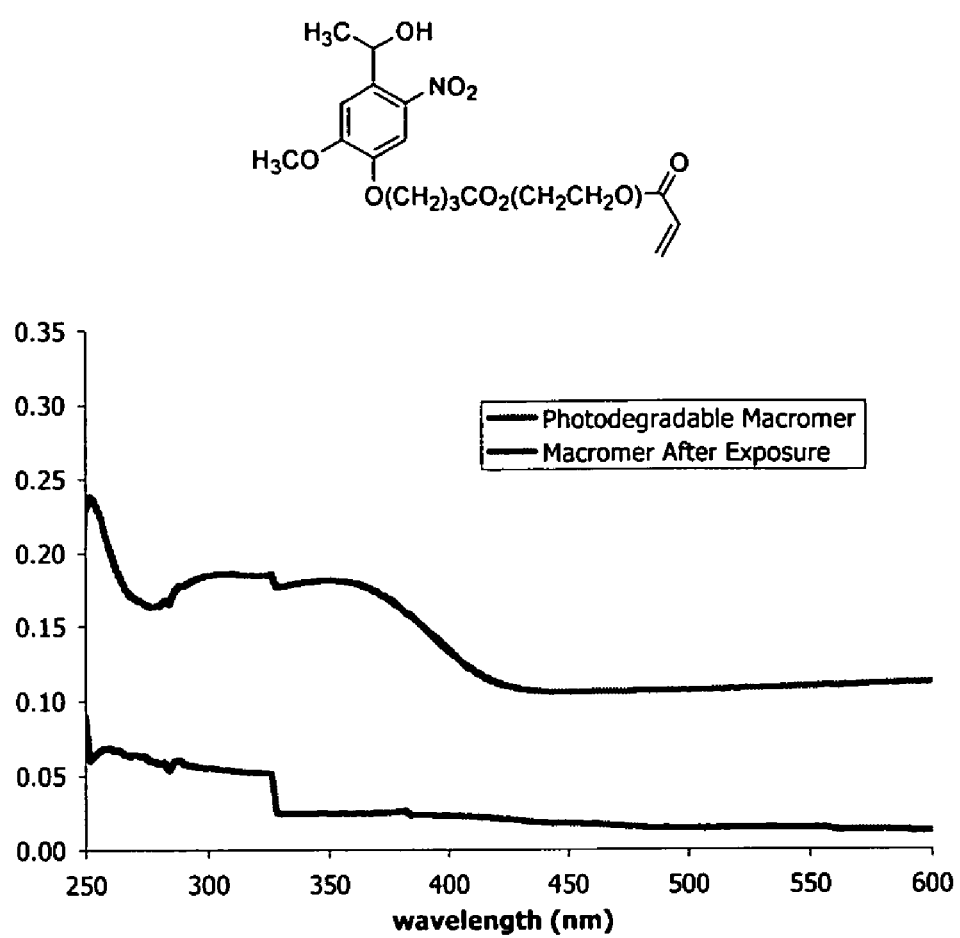
FIG. 4 shows the UV-Visible Absorption of poly(ethylene glycol) monoacrylate-4-(2-methoxy-5-nitro-4-(2-hydroxyethyl)phenoxy butanoate before and after exposure to 365 nm light (5 minutes).

The UV-Vis absorption spectra for poly(ethylene glycol) monoacrylate-4-(2-methoxy-5-nitro-4-(2-hydroxyethyl) phenoxy butanoate are shown in FIG. 4. The top line is the spectrum of poly(ethylene glycol) monoacrylate-4-(2-methoxy-5-nitro-4-(2-hydroxyethyl)phenoxy butanoate in water; the bottom line is the spectrum after the solution has been exposed to 365 nm light for 5 minutes. The poly(ethylene glycol) monoacrylate-4-(2-methoxy-5-nitro-4-(2-hydroxyethyl)phenoxy butanoate is clearly degrading; hydroxide anion is released.

General Procedure for Controlled 2-D Degradation using a photomask: A photomask is contacted with the surface of the hydrogel. The gel can be degraded using a 5 cm collimated flood exposure source coupled to an optical mask alignment system (Optical Associates, Inc. San Jose, Calif.), which generates 50-70 mW cm-2 of radiation (365 nm). An adjustable reaction chamber facilitates well-defined control over degradation. The spacing between the photomask and chamber bottom is controlled by micromanipulators coupled to a height sensor and the entire reaction chamber is integrated with the theta and lateral controls of the Mask aligner. Photomasks are made using emulsion films (Polychrome V; Kodak, Rochester, N.Y.) exposed with a high-resolution He—Ne red laser diode commercial plotter.

3-D Lithography may be accomplished using a series of photomasks with the mask alignment system described above, or through the use of a two-photon laser scanning microscope.

Figure 5:
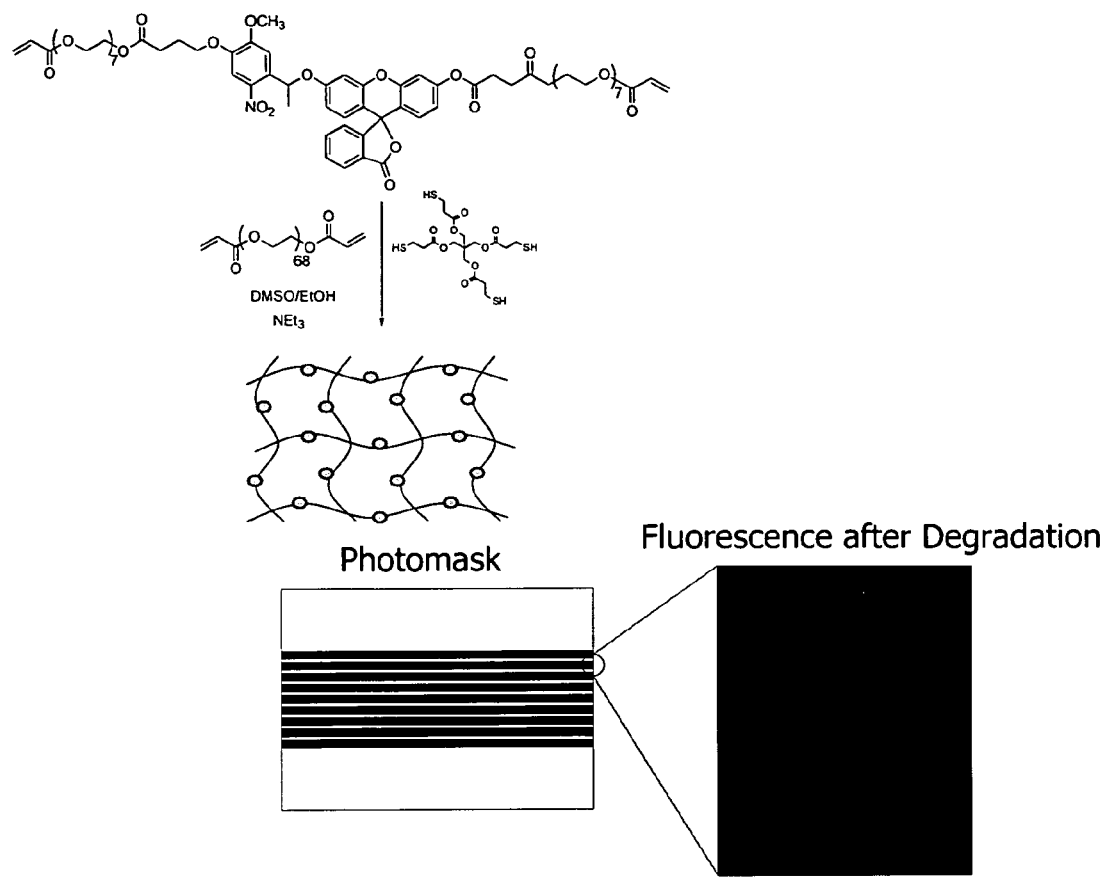
FIG. 5 shows one example of spatial control over photodegradation: exposed areas show increased fluorescence.

Spatial Control Over Degradation. Poly(ethylene glycol) diacrylate with the photodegradable 2-methoxy-5-nitro-4-(2-fluoresceinoxyethyl)phenoxy butanoate group incorporated into the middle of the macromer chain was copolymerized with poly(ethylene glycol) diacrylate using pentaerythritol tetrakis(3-mercaptopropionate) as a crosslinking agent in a pseudo-Michael addition. The polymerization solution was spin-coated onto a polycarbonate substrate. The film was exposed to 365 nm light under a photomask. If photodegradation occurs, an increase in fluorescence in the exposed areas is expected. This is shown in FIG. 5, where the areas of the film exposed to the photomask show an increase in fluorescence.

Temporal Control Over Degradation. The photocaged bis-coumarin poly(ethylene glycol) diacrylate shown in Scheme 16 was copolymerized with poly(ethylene glycol) diacrylate using pentaerythritol tetrakis(3-mercaptopropionate) as a crosslinking agent in a pseudo-Michael addition. The resulting hydrogel was immersed in water and exposed to 365 nm light. After 30 seconds exposure, the solution was slightly fluorescent blue. After 10 minutes exposure, the solution became more strongly fluorescent blue (data not shown), indicating the release of poly(ethylene glycol) bis-coumarin increases with increasing exposure time.

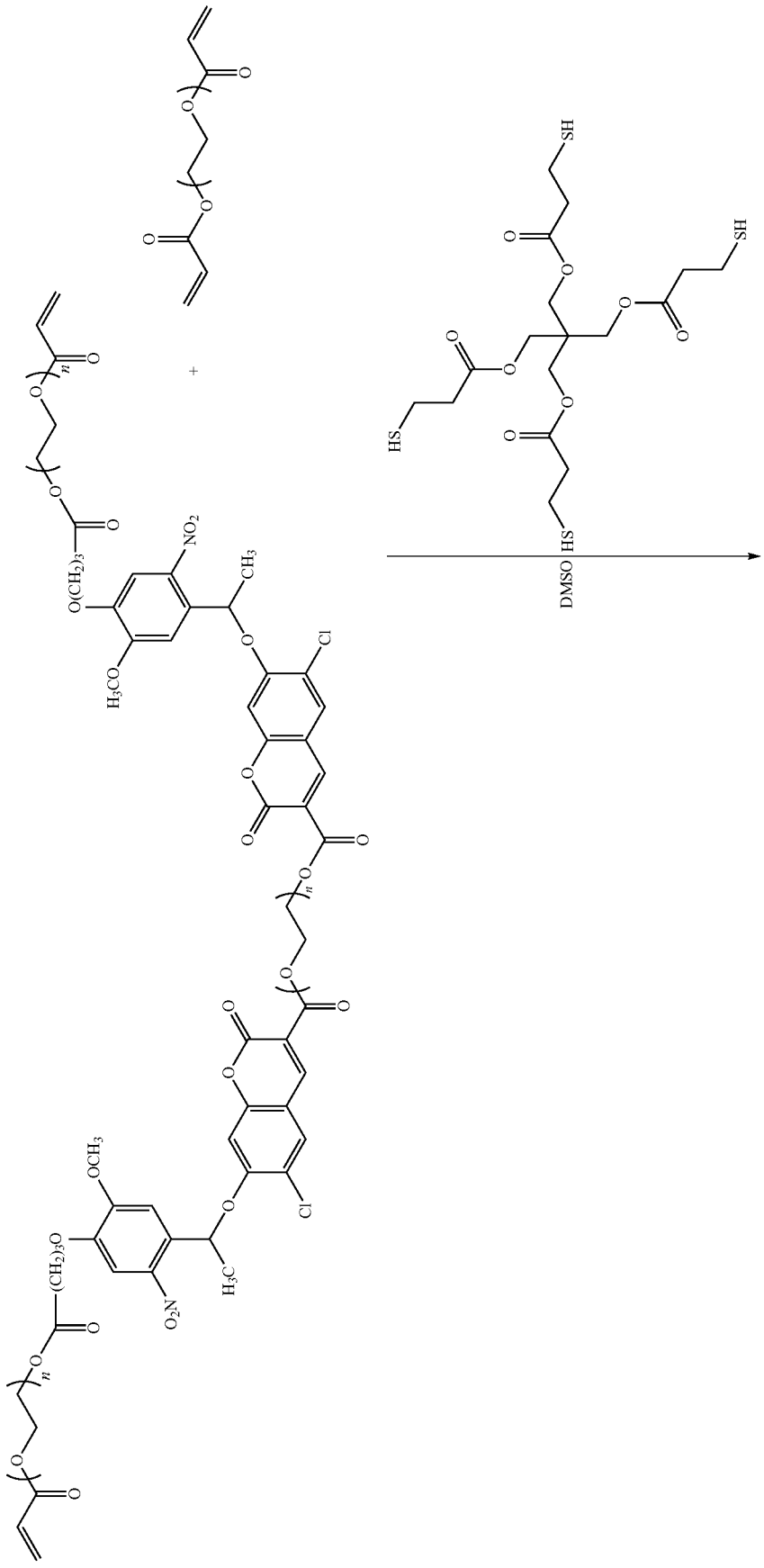
Scheme 16.

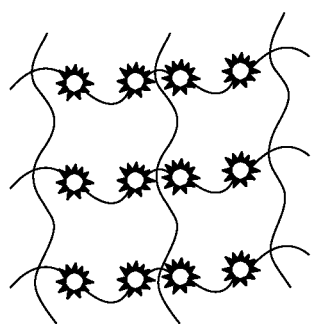
-continued

Figure 6:
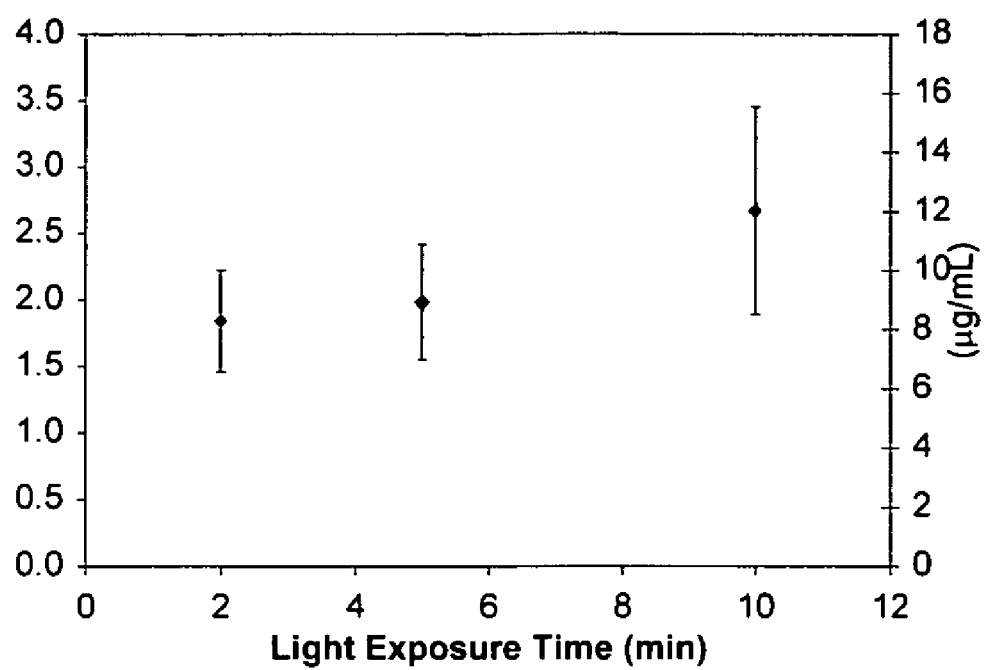
FIG. 6 shows the release of dexamethasone with increasing exposure time.

Release of a therapeutic molecule. Tethered dexamethasone was polymerized into a poly(ethylene glycol) gel network using pentaerythritol tetrakis(3-mercaptopropionate) as a crosslinking agent in a pseudo-Michael addition to form discs, approximately 5 mm by 1 mm. Unreacted monomer was leached from the hydrogel using methanol. The loading concentration of releasable dexamethasone ranged from 5-640 µg per gel; each gel was suspended in 0.5 mL solvent. Each gel was exposed to UV light for 12 minutes, and the resulting release of dexamethasone quantified by HPLC. Only the gels with highest loading released detectable amounts of dexamethasone (the remaining concentrations were below the detection limits of the HPLC detector). After 12 minutes, 21% of the dexamethasone was released. This concentration, 273 µg/mL, is significantly higher than the amount shown in the literature needed to promote stem cell differentiation (100 nM) (Nuttleman, C. R.; Tripodi, M. C.; Anseth, K. S. "Dexamethasone-functionalized gels induce osteogenic differentiation of encapsulated hMSCs" *J. Biomed. Mtls. Res.* 2005, 76A, 183-195). If the gels are exposed for varying amounts of time, the amount of dexamethasone released increased, but the error is large. These results are shown in FIG. 6, where Dex released from Gel (%) is plotted (left) along with µg/mL (right).

Photodegradable Hydrogels

General procedure for formation of hydrogel: Formation of a hydrogel using these macromers is accomplished by reacting the acrylate end groups in a stoichiometric ratio with the thiol groups on a multifunctional thiol in water or dimethylsulfoxide. This may or may not require a catalyst as known in the art. The reactive end-groups can also be polymerized if a wavelength of light is used that does not induce photodegradation, or if polymerization is much faster than photodegradation. The solvent content of the hydrogel will vary directly with the molecular weight of the macromer. These reactions are known in the art. These solutions can be cast using a spin-coater to form a thin film, or cast into a confined geometry to form a gel.

Example: Poly(ethylene glycol) monoacrylate-4-(2-methoxy-5-nitro-4-(2-bromoethyl)phenoxy)butanoate and poly(ethylene glycol) monoacrylate 6-chloro-7-hydroxycoumarin-3-carboxylate are coupled using diisopropylethylamine to obtain the photodegradable PEG diacrylate. This diacrylate is then polymerized into a network using a visible-light photoinitiator or via a Michael-type addition using multifunctional thiols. The resulting hydrogels contain crosslinks that are photolyzable by single and two-photon photolysis using the methods described herein.

When a group of substituents is disclosed herein, it is understood that all individual members of those groups and all subgroups, including any isomers and enantiomers of the group members, and classes of compounds that can be formed using the substituents are disclosed separately. When a compound is claimed, it should be understood that compounds known in the art including the compounds disclosed in the references disclosed herein are not intended to be included. When a Markush group or other grouping is used herein, all individual members of the group and all combinations and subcombinations possible of the group are intended to be individually included in the disclosure.

Every formulation or combination of components described or exemplified can be used to practice the invention, unless otherwise stated. Specific names of compounds are intended to be exemplary, as it is known that one of ordinary skill in the art can name the same compounds differently. When a compound is described herein such that a particular isomer or enantiomer of the compound is not specified, for example, in a formula or in a chemical name, that description is intended to include each isomers and enantiomer of the compound described individual or in any combination. One of ordinary skill in the art will appreciate that methods, device elements, starting materials, synthetic methods, and uses other than those specifically exemplified can be employed in the practice of the invention without resort to undue experimentation. All art-known functional equivalents, of any such methods, device elements, starting materials, synthetic methods, and uses are intended to be included in this invention. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

In general the terms and phrases used herein have their art-recognized meaning, which can be found by reference to standard texts, journal references and contexts known to those skilled in the art. The definitions are provided to clarify their specific use in the context of the invention. All patents and publications mentioned in the specification are indicative of the levels of skill of those skilled in the art to which the invention pertains.

One skilled in the art would readily appreciate that the present invention is well adapted to carry out the objects and obtain the ends and advantages mentioned, as well as those inherent therein. The photodegradable compounds, macromers, and other components of the compounds, as well as the compounds and methods and accessory methods described herein as presently representative of preferred embodiments are exemplary and are not intended as limitations on the scope of the invention. Changes therein and other uses will occur to those skilled in the art, which are encompassed within the spirit of the invention, are defined by the scope of the claims.

Although the description herein contains many specificities, these should not be construed as limiting the scope of the invention, but as merely providing illustrations of some of the embodiments of the invention. Thus, additional embodiments are within the scope of the invention and within the following claims. All references cited herein are hereby incorporated by reference to the extent that there is no inconsistency with the disclosure of this specification. Some references provided herein are incorporated by reference herein to provide details concerning additional starting materials, additional methods of synthesis, additional methods of analysis and additional uses of the invention.

REFERENCES

1. Wilcox, M.; Viola, R. W.; Johnson, K. W.; Billington, A. P.; Carpenter, B. K.; McCray, J. A.; Guzikowski, A. P.; Hess, G. P. "Synthesis of Photolabile 'Precursors' of Amino-Acid Neurotransmitters" J. Org. Chem. 1990, 55, 1585-1589.
2. Holmes, C. P.; Jones, D. G. "Reagents for Combinatorial Organic Synthesis: Development of a New o-Nitrobenzyl Photolabile Linker for Solid Phase Synthesis" J. Org. Chem. 1995, 60, 2318-2319.
3. Ruhland, B.; Bhandari, A.; Gordon, E. M.; Gallop, M. A. "Solid-Supported Combinatorial Synthesis of Structurally Diverse β-Lactams" J. Am. Chem. Soc. 1996, 118, 253-254.
4. Luou, Y.; Shoichet, M. M. "A Photolabile Hydrogel for Guided Three-Dimensional Cell Growth and Migration" Nature Materials 2004, 3, 249-253.
5. Lei, M.; Gu, Y.; Baldi, A.; Siegel, R. A.; Ziaie, B. "High-Resolution Technique for Fabricating Environmentally Sensitive Hydrogel Microstructures" Langmuir 2004, 20(21), 8947-8951.
6. Baldursdottir, S. G.; Kjoniksen, A.-L.; Karlsen, J.; Nystroem, B.; Roots, J.; Tonnesen, H. H. "Riboflavin-Photosensitized Changes in Aqueous Solutions of Alginate. Rheological Studies" Biomacromolecules 2003, 4(2), 429-436.
7. Kjoniksen, A.-L.; Baldursdottir, S. G.; Nystroem, B. "Characterization of Riboflavin-Photosensitized Changes in Aqueous Solutions of Alginate by Dynamic Light Scattering" Macromol. Biosci. 2004, 4(2), 76-83.
8. Yui, N.; Okano, T.; Sakurai, Y. "Photo-Responsive Degradation of Heterogeneous Hydrogels Comprising Cross-Linked Hyaluronic-Acid and Lipid Microspheres for Temporal Drug-Delivery" Journal of Controlled Release 1993, 26(2), 141-145.

We claim:
1. A photodegradable macromer, comprising:
a) a photodegradable group having the formula:

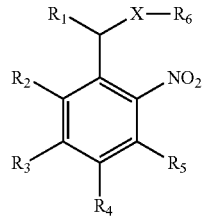

where X is O, N or S;
$R_1$ is selected from the group consisting of: hydrogen, straight-chain or branched C1-C10 alkyl, aryl, alkoxy, aryloxy or carboxy groups in which one or more carbon atoms can be independently optionally substituted with one or more heteroatoms, and one or more hydrogen atoms can be independently optionally substituted with hydroxyl, halogen or oxygen atoms;
$R_2$-$R_6$ are independently selected from the group consisting of: hydrogen; one or more polymerizable groups, one or more reactive end groups; straight chain, branched or cyclic C1-C20 alkyl, alkenyl, alkynyl groups in which one or more of the carbon atoms are optionally substituted with non-hydrogen substituents and wherein one or more C, CH or CH2 moiety can be replaced with an oxygen atom, a nitrogen atom, an NR' group, or a S atom; and an optionally substituted aromatic or non-aromatic ring structure, wherein two or more R groups can be linked to form one or more rings which can contain one or more of the same or different heteroatoms;
one or more R groups can be optionally substituted with one or more substituent groups selected from halogens; nitro groups; cyano groups; isocyano groups; thiocyano groups; isothiocyano groups; azide groups; —$SO_2$ groups; —$OSO_3H$ groups; one or more optionally substituted straight-chain, branched or cyclic alkyl, alkenyl or alkynyl groups; OR'; —CO—OR'; —O—CO—R'; —N(R')$_2$; —CO—N(R')$_2$; —NR'—CO—OR'; —SR'; —SOR'; —$SO_2$—R'; —$SO_3$R'; —$SO_2$N(R')$_2$; —P(R')$_2$; —OPO$_3$(R')$_2$; and —Si(R')$_3$ wherein each R', independent of other R' in the substituent group can be a hydrogen, an optionally substituted straight-chain, branched or cyclic alkyl, alkenyl or alkynyl group wherein one or more C, CH or CH$_2$ groups therein can be replaced with an O atom, N atom, S atom or —NH group; an optionally substituted aromatic group, two or more R' groups can be linked together to form a ring which may contain one or more of the same or different heteroatoms; and
R' can in turn be optionally substituted with one or more groups selected from the group consisting of halogens, nitro groups; cyano groups; isocyano groups; thiocyano groups; isothiocyano groups; azide groups; —$SO_2$ groups; —$OSO_3H$ groups; straight-chain, branched or cyclic alkyl, alkenyl or alkynyl groups; halogenated alkyl groups; hydroxyl groups; alkoxy groups; carboxylic acid and carboxylic ester groups; amine groups; carbamate groups, thiol groups, thioether and thioester groups; sulfoxide groups, sulfone groups; sulfide groups; sulfate and sulfate ester groups; sulfonate and sulfonate ester groups; sulfonamide groups, sulfonate ester groups; phosphine groups; phosphate and phosphate ester groups; phosphonate and phosphonate ester groups; and alkyl-substituted silyl groups;
(b) a backbone structure comprising one or more repeating units, wherein the backbone structure is selected from the group consisting of: poly(ethylene glycol), poly(ethylene oxide), poly(vinyl alcohol), poly(styrene), poly(acrylate), poly(methacrylate), poly(vinylether), poly(urethane), polypropylene, polyester and polyethylene which backbone structure is attached to the photodegradable group directly or through a linker;
(c) one reactive end group at an end of the macromer; and optionally,
(d) one or more therapeutic agents; and optionally
(e) one or more caged groups
wherein the backbone structure, reactive end group, optional one or more therapeutic agents and optional caged groups are linked to any of the R groups of the photodegradable group
wherein the reactive end group is an alkene.

2. A photodegradable macromer, comprising:
a) a photodegradable group having the formula:

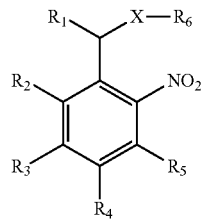

where X is O, N or S;
$R_1$ is selected from the group consisting of: hydrogen, straight-chain or branched C1-C10 alkyl, aryl, alkoxy, aryloxy or carboxy groups in which one or more carbon atoms can be independently optionally substituted with one or more heteroatoms, and one or more hydrogen atoms can be independently optionally substituted with hydroxyl, halogen or oxygen atoms;
R2-R6 are independently selected from the group consisting of: hydrogen; one or more polymerizable groups, one or more reactive end groups; straight chain, branched or cyclic C1-C20 alkyl, alkenyl, alkynyl groups in which one or more of the carbon atoms are optionally substituted with non-hydrogen substituents and wherein one or more C, CH or CH2 moiety can be replaced with an oxygen atom, a nitrogen atom, an NR' group, or a S atom; and an optionally substituted aromatic or non-aromatic ring structure, wherein two or more R groups can be linked to form one or more rings which can contain one or more of the same or different heteroatoms;
one or more R groups can be optionally substituted with one or more substituent groups selected from halogens; nitro groups; cyano groups; isocyano groups; thiocyano groups; isothiocyano groups; azide groups; —SO₂ groups; —OSO₃H groups; one or more optionally substituted straight-chain, branched or cyclic alkyl, alkenyl or alkynyl groups; OR'; —CO—OR'; —O—CO—R'; —N(R')₂; —CO—N(R')₂; —NR'—CO—OR'; —SR'; —SOR'; —SO₂—R'; —SO₃R'; —SO₂N(R')₂; —P(R')₂; —OPO₃(R')₂; and —Si(R')₃ wherein each R', independent of other R' in the substituent group can be a hydrogen, an optionally substituted straight-chain, branched or cyclic alkyl, alkenyl or alkynyl group wherein one or more C, CH or CH₂ groups therein can be replaced with an O atom, N atom, S atom or —NH group; an optionally substituted aromatic group, two or more R' groups can be linked together to form a ring which may contain one or more of the same or different heteroatoms; and
R' can in turn be optionally substituted with one or more groups selected from the group consisting of halogens, nitro groups; cyano groups; isocyano groups; thiocyano groups; isothiocyano groups; azide groups; —SO₂ groups; —OSO₃H groups; straight-chain, branched or cyclic alkyl, alkenyl or alkynyl groups; halogenated alkyl groups; hydroxyl groups; alkoxy groups; carboxylic acid and carboxylic ester groups; amine groups; carbamate groups, thiol groups, thioether and thioester groups; sulfoxide groups, sulfone groups; sulfide groups; sulfate and sulfate ester groups; sulfonate and sulfonate ester groups; sulfonamide groups, sulfonate ester groups; phosphine groups; phosphate and phosphate ester groups; phosphonate and phosphonate ester groups; and alkyl-substituted silyl groups;
(b) a backbone structure comprising one or more repeating units, wherein the backbone structure is selected from the group consisting of: poly(ethylene glycol), poly(ethylene oxide), poly(vinyl alcohol), poly(styrene), poly(acrylate), poly(methacrylate), poly(vinylether), poly(urethane), polypropylene, polyester and polyethylene which backbone structure is attached to the photodegradable group directly or through a linker;
(c) one reactive end group at an end of the macromer; and optionally,
(d) one or more therapeutic agents; and optionally
(e) one or more caged groups
wherein the backbone structure, reactive end group, optional one or more therapeutic agents and optional caged groups are linked to any of the R groups of the photodegradable group, wherein the reactive end group is an acrylate group.

3. A photodegradable macromer, comprising:
a) a photodegradable group having the formula:

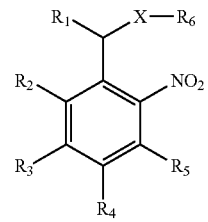

where X is O, N or S;
$R_1$ is selected from the group consisting of: hydrogen, straight-chain or branched C1-C10 alkyl, aryl, alkoxy, aryloxy or carboxy groups in which one or more carbon atoms can be independently optionally substituted with one or more heteroatoms, and one or more hydrogen atoms can be independently optionally substituted with hydroxyl, halogen or oxygen atoms;
R2-R6 are independently selected from the group consisting of: hydrogen; one or more polymerizable groups, one or more reactive end groups; straight chain, branched or cyclic C1-C20 alkyl, alkenyl, alkynyl groups in which one or more of the carbon atoms are optionally substituted with non-hydrogen substituents and wherein one or more C, CH or CH2 moiety can be replaced with an oxygen atom, a nitrogen atom, an NR' group, or a S atom; and an optionally substituted aromatic or non-aromatic ring structure, wherein two or more R groups can be linked to form one or more rings which can contain one or more of the same or different heteroatoms;
one or more R groups can be optionally substituted with one or more substituent groups selected from halogens; nitro groups; cyano groups; isocyano groups; thiocyano groups; isothiocyano groups; azide groups; —SO₂ groups; —OSO₃H groups; one or more optionally substituted straight-chain, branched or cyclic alkyl, alkenyl or alkynyl groups; OR'; —CO—OR'; —O—CO—R'; —N(R')₂; —CO—N(R')₂; —NR'—CO—OR'; —SR'; —SOR'; —SO₂—R'; —SO₃R'; —SO₂N(R')₂; —P(R')₂; —OPO₃(R')₂; and —Si(R')₃ wherein each R', independent of other R' in the substituent group can be a hydrogen, an optionally substituted straight-chain, branched or cyclic alkyl, alkenyl or alkynyl group wherein one or more C, CH or CH$_2$ groups therein can be replaced with an O atom, N atom, S atom or —NH group; an optionally substituted aromatic group, two or more R' groups can be linked together to form a ring which may contain one or more of the same or different heteroatoms; and R' can in turn be optionally substituted with one or more groups selected from the group consisting of halogens, nitro groups; cyano groups; isocyano groups; thiocyano groups; isothiocyano groups; azide groups; —SO$_2$ groups; —OSO$_3$H groups; straight-chain, branched or cyclic alkyl, alkenyl or alkynyl groups; halogenated alkyl groups; hydroxyl groups; alkoxy groups; carboxylic acid and carboxylic ester groups; amine groups; carbamate groups, thiol groups, thioether and thioester groups; sulfoxide groups, sulfone groups; sulfide groups; sulfate and sulfate ester groups; sulfonate and sulfonate ester groups; sulfonamide groups, sulfonate ester groups; phosphine groups; phosphate and phosphate ester groups; phosphonate and phosphonate ester groups; and alkyl-substituted silyl groups;

(b) a backbone structure comprising one or more repeating units, wherein the backbone structure is selected from the group consisting of: poly(ethylene glycol), poly(ethylene oxide), poly(vinyl alcohol), poly(styrene), poly(acrylate), poly(methacrylate), poly(vinylether), poly(urethane), polypropylene, polyester and polyethylene which backbone structure is attached to the photodegradable group directly or through a linker;

(c) one reactive end group at an end of the macromer; and optionally, (d) one or more therapeutic agents; and optionally (e) one or more caged groups wherein the backbone structure, reactive end group, optional one or more therapeutic agents and optional caged groups are linked to any of the R groups of the photodegradable group, wherein the photodegradable group breaks a bond upon exposure to light in the visible wavelength range.

4. The compound having the formula:

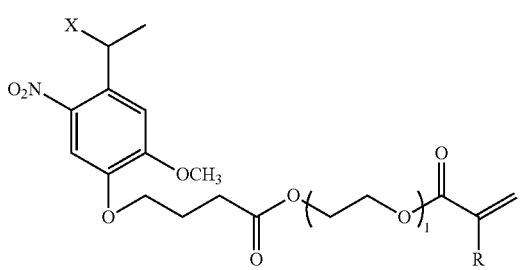

R = ——H, ——CH$_3$ where X is a halogen, —OH or a therapeutic agent, wherein the moiety in parenthesis represents poly(ethylene glycol).

5. The compound having the formula:

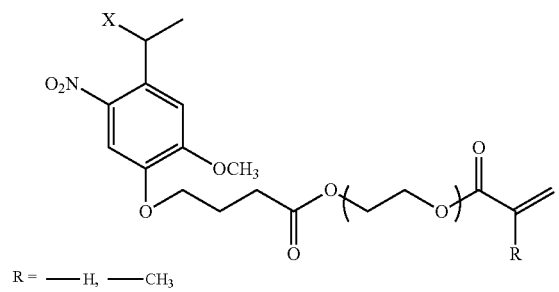

R = ——H, ——CH$_3$ where X is a halogen or —OH, wherein the moiety in parenthesis represents poly(ethylene glycol).

6. A macromer comprising:

a) a photodegradable group having the formula:

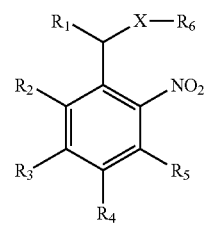

where X is O, N or S;

R$_1$ is selected from the group consisting of: hydrogen, straight-chain or branched C1-C10 alkyl, aryl, alkoxy, aryloxy or carboxy groups in which one or more carbon atoms can be independently optionally substituted with one or more heteroatoms, and one or more hydrogen atoms can be independently optionally substituted with hydroxyl, halogen or oxygen atoms;

one of R$_2$, R$_3$, R$_4$ and R$_5$ is a backbone structure comprising one or more repeating units selected from the group consisting of: poly(ethylene glycol), poly(ethylene oxide), poly(vinyl alcohol), poly(styrene), poly(acrylate), poly(methacrylate), poly(vinylether), poly(urethane), polypropylene, polyester and polyethylene;

the others of R$_2$, R$_3$, R$_4$ and R$_5$ are independently selected from the group consisting of: hydrogen; one or more polymerizable groups, one or more reactive end groups; straight chain, branched or cyclic C1-C20 alkyl, alkenyl, alkynyl groups in which one or more of the carbon atoms are optionally substituted with non-hydrogen substituents and wherein one or more C, CH or CH2 moiety can be replaced with an oxygen atom, a nitrogen atom, an NR' group, or a S atom; and an optionally substituted aromatic or non-aromatic ring structure, wherein two or more R groups can be linked to form one or more rings which can contain one or more of the same or different heteroatoms;

one or more R groups can be optionally substituted with one or more substituent groups selected from halogens; nitro groups; cyano groups; isocyano groups; thiocyano groups; isothiocyano groups; azide groups; —SO$_2$ groups; —OSO$_3$H groups; one or more optionally substituted straight-chain, branched or cyclic alkyl, alkenyl or alkynyl groups; OR'; —CO—OR'; —O—CO—R'; —N(R')$_2$; —CO—N(R')$_2$; —NR'—CO—OR'; —SR'; —SOR'; —SO$_2$—R'; —SO$_3$R'; —SO$_2$N(R')$_2$; —P(R')$_2$; —OPO$_3$(R')$_2$; and —Si(R')$_3$ wherein each R', independent of other R' in the substituent group can be a hydrogen, an optionally substituted straight-chain, branched or cyclic alkyl, alkenyl or alkynyl group wherein one or more C, CH or $CH_2$ groups therein can be replaced with an O atom, N atom, S atom or —NH group; an optionally substituted aromatic group, two or more R' groups can be linked together to form a ring which may contain one or more of the same or different heteroatoms; and R' can in turn be optionally substituted with one or more groups selected from the group consisting of halogens, nitro groups; cyano groups; isocyano groups; thiocyano groups; isothiocyano groups; azide groups; —$SO_2$ groups; —$OSO_3H$ groups; straight-chain, branched or cyclic alkyl, alkenyl or alkynyl groups; halogenated alkyl groups; hydroxyl groups; alkoxy groups; carboxylic acid and carboxylic ester groups; amine groups; carbamate groups, thiol groups, thioether and thioester groups; sulfoxide groups, sulfone groups; sulfide groups; sulfate and sulfate ester groups; sulfonate and sulfonate ester groups; sulfonamide groups, sulfonate ester groups; phosphine groups; phosphate and phosphate ester groups; phosphonate and phosphonate ester groups; and alkyl-substituted silyl groups;

wherein at least one of $R_1$, $R_2$, $R_3$, $R_4$, $R_5$ and $R_6$ comprises a reactive end group.

7. The macromer of claim 6, wherein the repeating unit is poly(ethylene glycol).

\* \* \* \* \*